(12) United States Patent
Amagasa

(10) Patent No.: US 7,586,275 B2
(45) Date of Patent: Sep. 8, 2009

(54) WIPER DEVICE CONTROL METHOD, WIPER DEVICE AND MOTOR WITH SPEED REDUCTION MECHANISM

(75) Inventor: Toshiyuki Amagasa, Nitta-gun (JP)

(73) Assignee: Mitsuba Corporation, Gunma (JP)

( * ) Notice: Subject to any disclaimer, the term of this patent is extended or adjusted under 35 U.S.C. 154(b) by 821 days.

(21) Appl. No.: 10/537,803

(22) PCT Filed: Dec. 4, 2003

(86) PCT No.: PCT/JP03/15519

§ 371 (c)(1),
(2), (4) Date: Jun. 7, 2005

(87) PCT Pub. No.: WO2004/054856

PCT Pub. Date: Jul. 1, 2004

(65) Prior Publication Data

US 2006/0113942 A1 Jun. 1, 2006

(30) Foreign Application Priority Data

Dec. 13, 2002 (JP) ............................. 2002-363041
Sep. 30, 2003 (JP) ............................. 2003-341493

(51) Int. Cl.
*H02P 1/00* (2006.01)
*H02P 3/00* (2006.01)
*H02P 3/20* (2006.01)

(52) U.S. Cl. ........................ 318/282; 318/280; 318/283; 318/286; 318/443; 318/444

(58) Field of Classification Search ................ 318/443, 318/280, 282, 283, 286, 444
See application file for complete search history.

(56) References Cited

U.S. PATENT DOCUMENTS 6,249,098 B1 * 6/2001 Miyazaki et al. ............ 318/280
6,384,557 B1   5/2002 Weber et al.

FOREIGN PATENT DOCUMENTS

| JP | 2000-118360 | 4/2000 |
| JP | 2002-2454   | 1/2002 |
| JP | 2002-262515 | 9/2002 |
| JP | 2002-264773 | 9/2002 |
| JP | 2002-264777 | 9/2002 |
| JP | 2003-54371  | 2/2003 |

\* cited by examiner

*Primary Examiner*—Bentsu Ro
*Assistant Examiner*—Erick Glass
(74) *Attorney, Agent, or Firm*—Wenderoth, Lind & Ponack, L.L.P.

(57) ABSTRACT

A wiper device includes a sensor magnet fitted to an output shaft so that when wiper arms are positioned at upper reversal positions B relative to an origin position O, both hall ICs are opposed to an S-pole and when the wiper arms are positioned at lower reversal positions A relative to the origin point O, at least one of the hall ICs is opposed to an N-pole. When the wiper arms are abnormally stopped, the sensor magnet determines at the time of re-starting whether the wiper arms are positioned at the lower reversal positions A or at the upper reversal positions B relative to the origin position O and always starts the wiper arms toward the origin position O, whereby the positions of the wiper arms can be accurately detected by two hall ICs. After re-setting position data by re-starting the wiper arms toward the origin position O, the sensor magnet performs a normal control.

18 Claims, 12 Drawing Sheets

⟨stored position (37a:S, 37b:N)⟩
drive gear forward rotating direction (a)

⟨lower reversal position (37a:N, 37b:N)⟩

(b)

⟨origin position (37a:forward rotation N →S,
reverse rotation S→N, 37b:S)⟩

(c)

⟨upper reversal position
(37a:S, 37b:S)⟩

(d)

| | Hall IC 37a (when rotating forward) (when rotating backward) | Hall IC 37b |
|---|---|---|
| stored position | S | N |
| lower reversal position | N | N |
| origin position reset | N→S or S→N | S |
| to upper reversal position | S | S |

F I G. 5

<stored position (120:S)> drive gear forward rotating direction (a)

<lower reversal position (120:S)>

(b)

<origin position
(120:forward rotation N→S
reverse rotation S→N)>

(c)

<upper reversal position (120:N)>

(d)

|  | Hall IC 20 |
|---|---|
| lower limit position X | S |
| stored position C | S |
| lower reversal position A | S |
| origin position O | S ⇔ N |
| origin position O to upper reversal position B | N |

WIPER DEVICE CONTROL METHOD, WIPER DEVICE AND MOTOR WITH SPEED REDUCTION MECHANISM

TECHNICAL FIELD

This invention relates to an electric motor to be used for a wiper device of a vehicle such as an automobile, a method of controlling such an electric motor and a method of controlling a wiper device of a vehicle such as an automobile. More particularly, the present invention relates to a technique of controlling a wiper device using a reversible electric motor as drive source.

BACKGROUND ART

An electric motor energized by a power source such as a battery loaded on the vehicle is normally used as drive source of a wiper device of a vehicle such as an automobile. Such an electric motor is equipped with a speed reduction mechanism for reducing the number of revolutions of the output shaft thereof to a predetermined number of revolutions, the motor is unitized as an electric motor with the speed reduction mechanism. One or two such motor units are used for a wiper device and a wiper arm is driven by the drive source of the motor unit or units to swing between an upper reversal position and a lower reversal position where it turns around. When a single motor unit is used, the wiper arm at the driver's seat and the one at the passenger seat are combined by a link and driven synchronously. When two motor units are used, the wiper arm at the driver's seat and the one at the passenger seat are connected to the respective motor units and driven synchronously, while detecting the revolutions of the armature shaft and those of the output shaft.

Meanwhile, the space for installing a wiper system has been reduced year by year as a result of the increase in the dimensions of the engine and also in the master power of the brake. As a result, there has been marketed a system that can drive a wiper within a small space by reversing the motion of the motor by less than 180° in order to reduce the operating area of the link to less than a half of the ordinary area. Since such a motor reversing system can reverse the moving direction of the wiper at any desired position within the wiping angle of the wiper, it is possible to define the lower reversal position and set a wiper storing space below the defined position. Many high quality cars currently adopt the system and are provided with such a wiper storing feature.

When reversing the motion of the motor of a wiper system, it is necessary to detect the wiper arm position in order to reverse the motion of the motor at a desired position of the wiper arm. The wiper arm position is detected by adding/subtracting the number of pulses generated by a pulse generator whose operation is interlocked with the rotary motion of the motor. A multi-polar magnet is fitted to the rotary shaft of the motor and a sensor typically comprising Hall ICs is arranged vis-à-vis the magnet in order to detect the polar change due to the rotation of the rotary shaft and to output a pulse signal. The pulse count is reset at a point (origin position) that operates as reference position for the rotary position of the output shaft of the motor unit in order to prevent discrepancies of pulses. A magnet is also fitted to the output shaft and a corresponding sensor is arranged in such a way that the sensor outputs a reference signal when a magnetic pole passes by a predetermined position.

The rotary angle of the motor from the reference position is computed by adding/subtracting the number of pulses after the reset so that it is possible to detect the current wiper arm position by taking the reduction ratio and the link ratio into consideration. It is also possible to detect the rotary speed of the moving wiper arm from the cycle period of pulses generated due to the rotary motion of the motor. The motor control system is provided with a reversing circuit which may typically be an H-bridge circuit that comprises FETs and a control means such as a CPU for controlling the rotary speed and the rotary angle of the motor so that the operation of driving the motor is controlled according to the wiper arm position and the rotary speed of the wiper arm.

In such a known wiper system that is adapted to be driven to operate by a reversible motor, if an abnormal condition arises because of a power shut down or some reason on the way of a wiping operation, the pulse count that indicates the wiper arm position can be lost to make it impossible to accurately recognize the wiper arm position when the wiper system is restarted. Then, the wiper blade can overrun to collide with the corresponding pillar at an end of the windshield and/or a component of the reduction mechanism or the link mechanism can hit the mechanical stopper arranged in the motor unit.

When it snows, snow flakes can be accumulated on the wiper blade so that it is sometimes very difficult to start driving the blade and move it from the stored position. Then, the car driver may often have to drive the blade to reciprocate between the stored position and the lower reversal position manually or automatically in order to activate the wiper device. However, when the motor is operated for forward rotation and reverse rotation repeatedly, the pulse count that indicates the wiper arm position can become to show discrepancies. Then, as discrepancies are accumulated, the operation of the blade can become unstable.

In the above-described wiper system, a sensor for detecting the rotary position of the output shaft is arranged not only at the origin position but also at the upper and lower reversal positions and at the stored position in order to detect the wiper arm position at a number of locations for the purpose of stabilizing the operation of the blade. Thus, an arrangement is made to quickly recognize the wiper arm position and prevent it from overrunning or otherwise operating unstably if the system is restarted without recognizing the position at which the wiper arm is stopped or if the pulse count gives rise to discrepancies and they are accumulated. However, with such an arrangement, since it is necessary to install at least four expensive sensors for a single motor, there is a problem that a unit price increases and it causes a cost rise.

An object of the present invention is to provide a wiper device control method, and the like that can reliably detect the wiper arm position with a small number of sensors.

SUMMARY OF THE INVENTION

A method for controlling a wiper device of the present invention, detecting the position of a wiper arm on the basis of the state where the wiper arm is positioned at a reference position, and driving the wiper arm to reciprocate between an upper reversal position and a lower reversal position for a wiping operation. When the wiper arm stops between the upper reversal position and the lower reversal position in operation, it always starts to move toward the reference position at the time of restarting.

Thus, according to the invention, if the wiper arm abnormally stops between the upper reversal position and the lower reversal position because of a power shut down or some other reason, it is forced to firstly pass the reference position without fail at the time of restarting. Therefore, it is possible to accurately grasp the wiper arm position.

Preferably, a stored position of the wiper arm is arranged below the lower reversal position in the wiper device and when the wiper arm stops at a position other than the stored position, the wiper arm is always started to move toward the reference position at the time of restarting.

In another aspect of the present invention, there is provided a wiper device adapted to be driven by an electric motor with a speed reduction mechanism including a motor main body having a rotary shaft and a speed reduction mechanism for reducing the number of revolutions of the rotary shaft and transmitting the revolutions of the rotary shaft to an output shaft, comprising: a wiper arm connected to the output shaft and adapted to reciprocate between an upper reversal position and a lower reversal position for a wiping operation; a first magnetism detection element arranged so as to be located vis-à-vis (opposite) a predetermined position of the output shaft when the wiper arm is at a reference position; a second magnetism detection element arranged at a position separated from the first magnetism detection element by a predetermined angle; and a sensor magnet arranged at the output shaft and having a first magnetic pole and a second magnetic pole arranged in a peripheral direction and showing different polarities. Both the first and second magnetism detection elements are located vis-à-vis (opposite) the second magnetic pole when the wiper arm is at the side of the upper reversal position relative to the reference position. At least the first magnetism detection element or the second magnetism detection element is located vis-à-vis (opposite) the first magnetic pole when the wiper arm is at the side of the lower reversal position relative to the reference position.

Thus, according to the invention, it is possible to judge if the wiper arm is at the side of the upper reversal position or at the side of the lower reversal position relative to the reference position by determining the polarity of the first magnetic pole and that of the second magnetic pole by means of the first and second magnetism detection elements. As a result, if the wiper arm abnormally stops between the upper reversal position and the lower reversal position because of a power shut down or some other reason, it is possible to force the wiper arm to firstly pass the reference position without fail at the time of restarting.

In the wiper device according to the invention, preferably, the first magnetism detection element may be located vis-à-vis (opposite) the boundary of the first magnetic pole and the second magnetic pole when the wiper arm passes reference position. In the wiper device according to the invention, preferably, both the first magnetism detection element and the second magnetism detection element may be located vis-à-vis (opposite) the first magnetic pole when the wiper arm is at the lower reversal position. In the wiper device according to the invention, preferably, the stored position of a wiper arm may be arranged below the lower reversal position and the first magnetism detection element may be located vis-à-vis (opposite) the first magnetic pole and the second magnetism detection element may be located vis-à-vis (opposite) the second magnetic pole when the wiper arm is at the stored position.

In the wiper device according to the invention, preferably, when the wiper arm stops between the upper reversal position and the lower reversal position in operation, it is always started to move toward the reference position at the time of restarting. In the wiper device according to the invention, preferably, when the wiper arm stops at a position other than the stored position, the wiper arm is always started to move toward the reference position at the time of restarting. With any of the above-described arrangements, when the wiper arm abnormally stops because of a power shut down or some other reason, the wiper arm is forced to firstly pass the reference position without fail at the time of restarting. Therefore, it is possible to accurately grasp the wiper arm position by means of the two magnetism detection elements.

Preferably, the wiper device according to the invention further comprises a sensor for detecting the rotary angle of the rotary shaft, which sensor starts detecting the rotary angle of the rotary shaft at the time when the wiper arm is positioned at the reference position.

In still another aspect of the invention, there is provided an electric motor with a speed reduction mechanism including a motor main body having a rotary shaft and a speed reduction mechanism for reducing the number of revolutions of the rotary shaft and transmitting the revolutions to an output shaft, comprising: a first magnetism detection element located at a reference position arranged vis-à-vis a predetermined state of the output shaft when the output shaft is at a predetermined position; a second magnetism detection element arranged at a position separated from the first magnetism detection element by a predetermined angle; and a sensor magnet arranged at the output shaft and having a first magnetic pole and a second magnetic pole arranged in a peripheral direction and showing different polarities. Both the first and second magnetism detection elements are located vis-à-vis the second magnetic pole when the output shaft is at one side relative to the reference position. At least the first magnetism detection element or the second magnetism detection element is located vis-à-vis the first magnetic pole when the output shaft is at the other side to the reference position.

Thus, according to the invention, it is possible to judge if the predetermined position of the output shaft is either side of the rotating direction relative to the reference position as the polarity of the first magnetic pole and that of the second magnetic pole are determined by means of the first and second magnetism detection elements. As a result, if the motor abnormally stops because of a power shut down or some other reason, it is possible to force it to start in such a way that the predetermined position of the output shaft thereof comes to be located vis-à-vis the reference position with the smallest rotary angle.

In still another aspect of the present invention, there is provided a method for controlling a wiper device, driving a wiper arm to reciprocate between an upper reversal position and a lower reversal position for a wiping operation. A reference position and a lower limit position for mechanically restricting the operation of the wiper arm are arranged respectively between the upper reversal position and the lower reversal position and below a stored position. When the wiper arm stops in operation, it is always started to move toward the lower limit position at the time of restarting.

Thus, according to the invention, if the wiper arm abnormally stops at any position, it is forced to pass the reference position or get to the lower limit position without fail in its one way movement after restarting. Therefore, it is possible to accurately grasp the wiper arm position at the time of restarting by detecting the passage through the reference position or the arrival to the lower limit position of the wiper arm at the reference position or the lower limit position. For example, in a control system where the wiper arm is driven by an electric motor and the wiper arm position is detected by means of the count value of the pulse signal output as a result of the rotary motion of the motor to control the operation of the wiper arm, the passage through the reference position of the wiper arm is detected by a sensor. On the other hand, the arrival to the lower limit position gives rise to mechanical restrictions and the count value of the pulse signal at that time shows a predetermined known value. In other words, with the above described control method, the position of the wiper arm at the time of restarting can be grasped by means of a single sensor that is arranged at the reference position.

In still another aspect of the present invention, there is provided a method for controlling a wiper device, driving a wiper arm to reciprocate between an upper reversal position and a lower reversal position for a wiping operation. A reference position, a stored position for holding the wiper arm at rest when the wiper arm is stopped and a lower limit position for mechanically restricting the operation of the wiper arm are arranged respectively between the upper reversal position and the lower reversal position, below the lower reversal position and below the stored position. When the wiper arm stops between the upper reversal position and the reference position in operation, it is always started to move toward the reference position at the time of restarting but, when the wiper arm stops between the reference position and the stored position in operation, it is started to move either toward the reference position or toward the lower limit position at the time of restarting.

Thus, according to the invention, when the wiper arm stops between the upper reversal position and the reference position in operation, it is always started to move toward the reference position at the time of restarting. With this arrangement, the wiper arm is forced to pass the reference position without fail in its one way movement after restarting. When the wiper arm stops between the reference position and the stored position in operation, it is started to move either toward the reference position or toward the lower limit position at the time of restarting. With this arrangement, the wiper arm is forced to pass the reference position or get to the lower limit position without fail in its one way movement after restarting. Since it is possible to accurately grasp the wiper arm position at the reference position and the lower limit position as described above, the wiper arm position can be grasped at the time of restarting by means of a single sensor arranged at the reference position by the above control method.

In still another aspect of the present invention, there is provided a method for controlling a wiper device, driving a wiper arm to reciprocate between an upper reversal position and a lower reversal position for a wiping operation. A stored position for holding the wiper arm at rest when the wiper device is stopped and a lower limit position for mechanically restricting the operation of the wiper arm are arranged respectively below the lower reversal position and below the stored position. When the wiper arm is driven to reciprocate between the lower reversal position and the stored position, it is moved to the lower limit position for operation in each go and return cycle.

Thus, according to the invention, when the wiper arm is driven to reciprocate between the lower reversal position and the stored position, it is moved to the lower limit position for operation in each go and return cycle. Since it is possible to accurately grasp the wiper arm position at the lower limit position as described above, the wiper arm position can be grasped in each go and return cycle by the above control method.

In still another aspect of the present invention, there is provided a method for controlling a wiper device, driving a wiper arm to reciprocate between an upper reversal position and a lower reversal position for a wiping operation. A reference position, a stored position for holding the wiper arm at rest when the wiper device is stopped and a lower limit position for mechanically restricting the operation of the wiper arm are arranged respectively between the upper reversal position and the lower reversal position, below the lower reversal position and below the stored position and, when the wiper arm is driven to reciprocate between the lower reversal position and the stored position and if the wiper arm is driven toward the side of the reference position beyond the lower limit position, it is moved to the lower limit position.

Thus, according to the invention, when the wiper arm is driven to reciprocate between the lower reversal position and the stored position and if the wiper arm is driven toward the side of the reference position beyond the lower limit position, it is moved to the lower limit position. In other words, if the wiper arm that is supposed to reciprocate between the lower reversal position and the stored position is driven to go beyond the lower reversal position, it is highly possible that the wiper arm position is not accurately grasped. Therefore, if such is the case, the wiper arm is driven to move to the lower limit position once in the subsequent operation. Since it is possible to accurately grasp the wiper arm position at the lower limit position as described above, the wiper arm position can be grasped accurately and the positional displacement can be dissolved by the above control method.

In still another aspect of the present invention, there is provided a method for controlling a wiper device, driving a wiper arm device by means of a motor to reciprocate between an upper reversal position and a lower reversal position for a wiping operation and controlling the operation of the wiper device by detecting the wiper arm position by means of the count value of the pulse signal output as a result of the rotary motion of the motor. A reference position for resetting the count value of the pulse signal to a reference value, a stored position for holding the wiper arm at rest when the wiper device is stopped and a lower limit position for mechanically restricting the operation of the wiper arm and causing the count value of the pulse signal to show a predetermined value are arranged respectively between the upper reversal position and the lower reversal position, below the lower reversal position and below the stored position. However, when the wiper arm stops in operation between the upper reversal position and the reference position, it is always started to move toward the reference position at the time of restarting and the count value of the pulse signal is reset to the reference value as the wiper arm passes the reference position and, when the wiper arm stops in operation between the reference position and the stored position, it is started either toward the reference position or the lower limit position at the time of restarting and the count value of the pulse signal is reset to the reference value or the predetermined value as the wiper arm passes the reference position or arrives at the lower limit position, whichever appropriate.

Thus, according to the invention, when the wiper arm stops between the upper reversal position and the reference position, it is started to move toward the reference position. As a result, the wiper arm passes the reference position thereafter in its one way movement without fail and the count value of the pulse signal is reset to the reference value so that it is possible to accurately grasp the position of the wiper arm. When, on the other hand, the wiper arm stops between the reference position and the stored position, it is started to move toward the reference position or the lower limit position at the time of restarting. As a result, the wiper arm passes the reference position or arrives at the lower limit position thereafter in its one way movement without fail and the count value of the pulse signal is reset to the reference value or the predetermined value, whichever appropriate, so that it is possible to accurately grasp the position of the wiper arm.

In still another aspect of the present invention, there is provided a method for controlling a wiper device, driving a wiper arm device by means of a motor to reciprocate between an upper reversal position and a lower reversal position for a wiping operation and controlling the operation of the wiper device by detecting the wiper arm position by means of the count value of the pulse signal output as a result of the rotary motion of the motor. A reference position for resetting the count value of the pulse signal to a reference value, a stored position for holding the wiper arm at rest when the wiper device is stopped and a lower limit position for mechanically restricting the operation of the wiper arm and causing the count value of the pulse signal to show a predetermined value are arranged respectively between the upper reversal position and the lower reversal position, below the lower reversal position and below the stored position. When the wiper arm is driven to reciprocate between the lower reversal position and the stored position, it is moved to the lower limit position for operation in each go and return cycle and the count value of the pulse signal is reset to the predetermined value in response to the arrival of the wiper arm to the lower limit position.

Thus, according to the invention, when the wiper arm is driven to reciprocate between the lower reversal position and the stored position, it is moved to the lower limit position for operation in each go and return cycle. It is grasped that the count value of the pulse signal that indicates the wiper arm position agrees with a predetermined value at the lower limit position. Thus, the wiper arm position can be grasped in each go and return cycle by means of the above control method.

In still another aspect of the present invention, there is provided a method for controlling a wiper device, driving a wiper arm by means of a motor to reciprocate between an upper reversal position and a lower reversal position for a wiping operation and controlling the operation of the wiper device by detecting the wiper arm position by means of the count value of the pulse signal output as a result of the rotary motion of the motor. A reference position for resetting the count value of the pulse signal to a reference value, a stored position for holding the wiper arm at rest when the wiper arm is stopped and a lower limit position for mechanically restricting the operation of the wiper arm and causing the count value of the pulse signal to show a predetermined value are arranged respectively between the upper reversal position and the lower reversal position, below the lower reversal position and below the stored position. When the wiper arm is driven to reciprocate between the lower reversal position and the stored position and if the count value of the pulse signal shows a value indicating as if the wiper arm were positioned at the side of the reference position beyond the lower limit position, the wiper arm is moved to the lower limit position and the count value of the pulse signal is reset to the predetermined value in response to the arrival of the wiper arm to the lower limit position.

Thus, according to the invention, when the wiper arm is driven to reciprocate between the lower reversal position and the stored position and if the count value of the pulse signal shows a value indicating as if the wiper arm were positioned at the side of the reference position beyond the lower limit position, the wiper arm is moved to the lower limit position. If the pulse count value exceeds the value for the lower reversal position, although the wiper arm is supposed to be driven to reciprocate between the lower reversal position and the stored position, it is highly possible that the wiper arm position is not accurately grasped. Therefore, if such is the case, the wiper arm is driven to move to the lower limit position once in the subsequent operation. Since it is grasped that the count value of the pulse signal that indicates the position of the wiper arm shows a predetermined value at the lower limit position, the wiper arm position can be grasped accurately and the positional displacement can be dissolved by means of the above control method.

BRIEF DESCRIPTION OF THE DRAWINGS

FIG. 5 is a table illustrating the combinations of magnetic poles that the Hall ICs detect respectively at corresponding control points;

DETAILED DESCRIPTION OF THE INVENTION

Now, an embodiment of the present invention will be described in detail below with reference to the accompanying drawings.

First Embodiment

Figure 1:
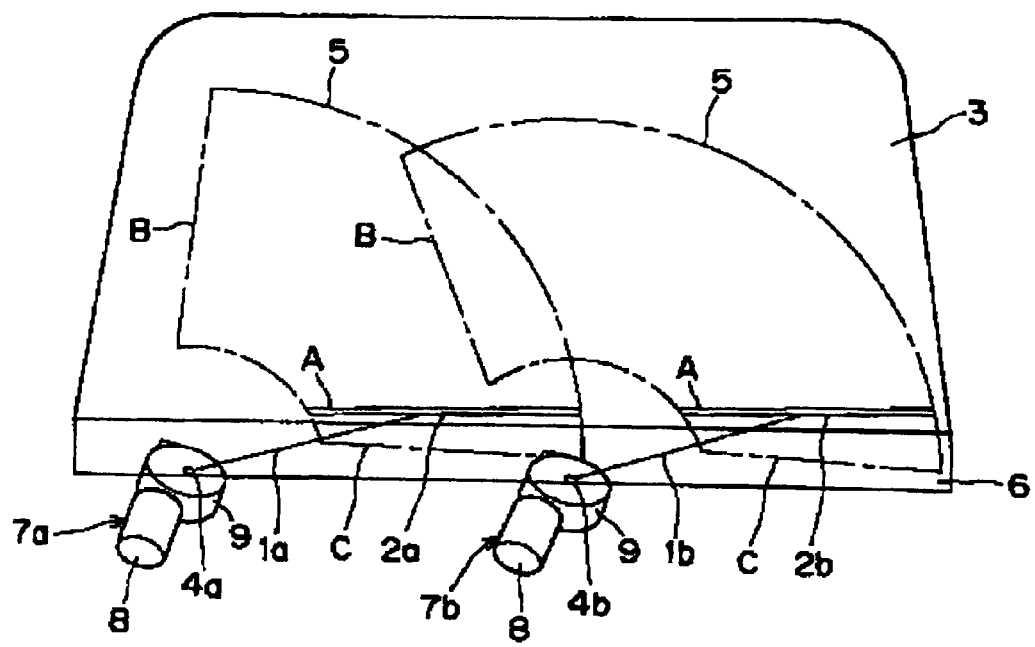
FIG. 1 is schematic illustration of a wiper device using electric motors with a speed reduction mechanism of an embodiment of the present invention as drive source.
Figure 2:
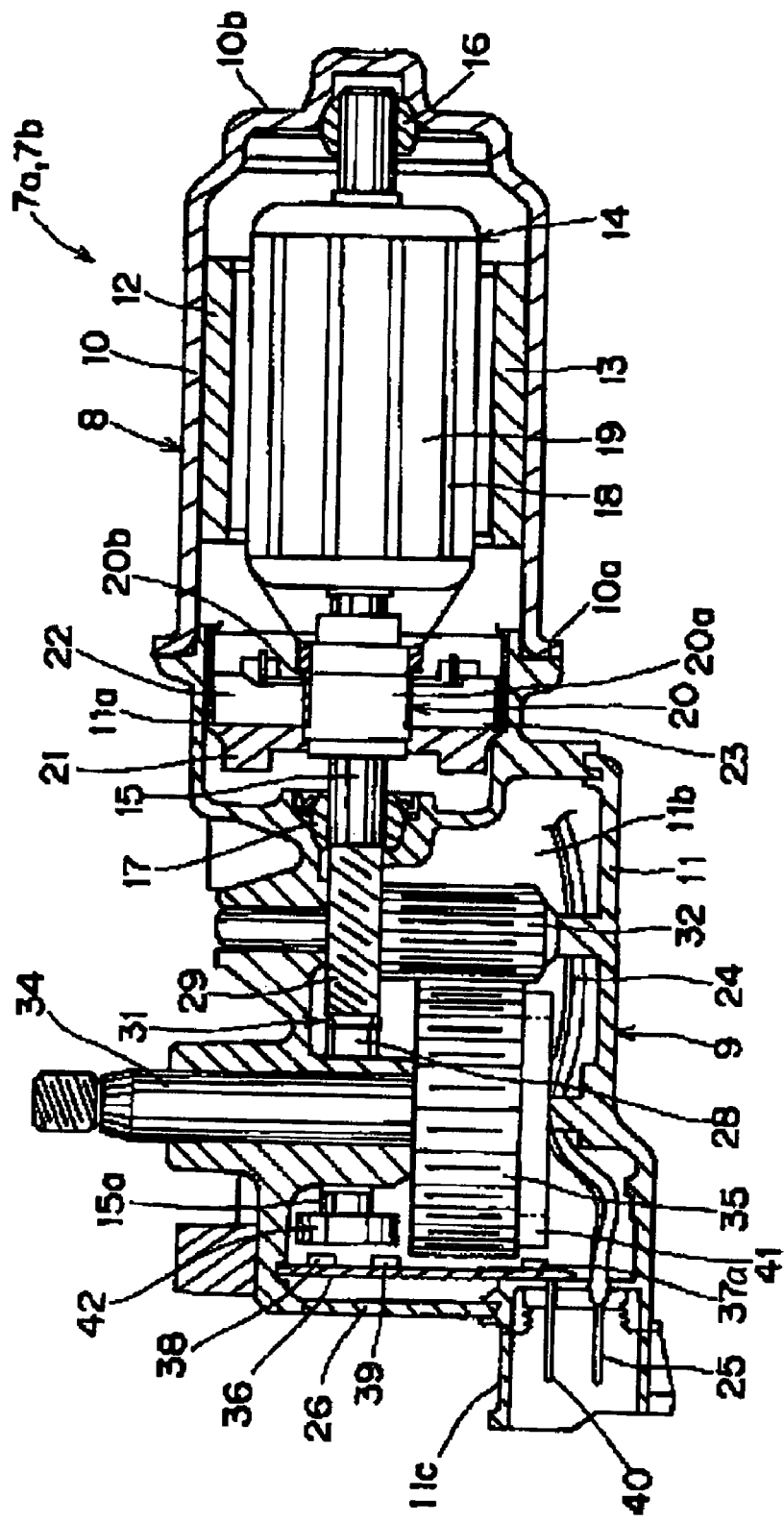
FIG. 2 is a schematic cross sectional view of the electric motors of FIG. 1.
Figure 3:
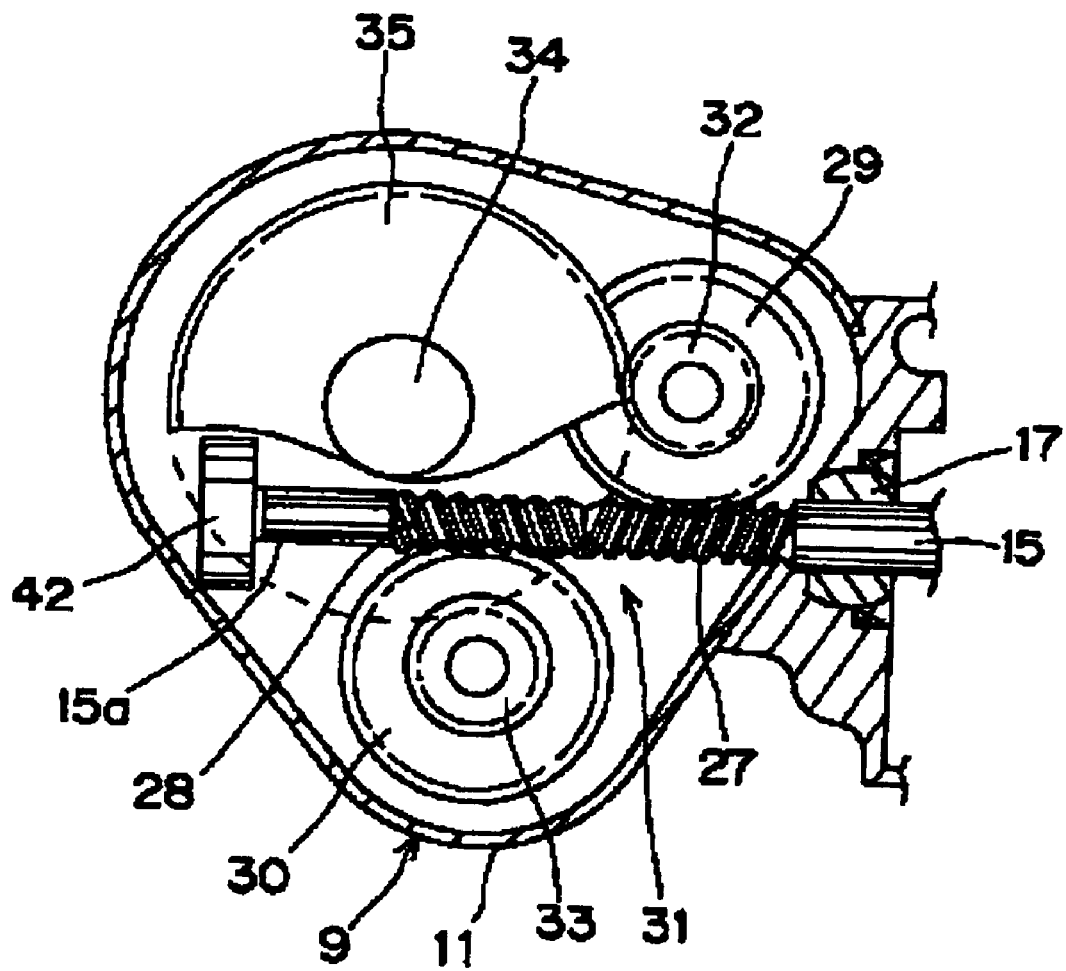
FIG. 3 is a partially cut out cross sectional view of the worm gear of FIG. 2, illustrating the engagement thereof.

FIG. 1 is schematic illustration of a wiper device using electric motors with a speed reduction mechanism of a first embodiment of the present invention as the drive source. FIG. 2 is a schematic cross sectional view of the electric motors of FIG. 1. FIG. 3 is a partially cut out cross sectional view of the worm gear of FIG. 2, illustrating the engagement thereof.

The wiper device illustrated in FIG. 1 comprises a wiper arm 1a swingably arranged at the side of the driver's seat of an automobile and a wiper arm 1b also swingably arranged at the side of the passenger seat of the automobile. A driver's seat side wiper blade 2a and a passenger seat side wiper blade 2b are fitted respectively to the wiper arm 1a and 1b. The wiper blades 2a, 2b are resiliently held in contact with a windshield 3 by means of spring members and the like (not shown) internally and respectively fitted thereto. The body of the automobile is provided with two wiper shafts 4a, 4b. The wiper arms 1a, 1b are fitted respectively to the wiper shafts 4a, 4b at the base sections thereof.

As each of the wiper blades 2a, 2b swings between upper reversal position B and lower reversal position A and hence in a wiping range 5 as indicated by dotted broken lines in FIG. 1, the rain drops or snow flakes adhering to the wiping range of the windshield 3 are wiped away. When the wiper device is at rest, each of the wiper blades 2a, 2b is moved to stored position C that is located below the lower reversal position A and stored in a storage section 6. The storage section 6 is arranged in the inside of the bonnet (not shown) of the body of the automobile. As the wiper blades 2a, 2b are stored in the storage section 6, the front view of the automobile is improved for both the driver and the passenger. An origin position (reference position) O is defined for each of the wiper blades 2a, 2b at a position above the lower reversal position A by about 15°.

The wiper device is provided with two electric motors having respective speed reduction mechanisms 7a, 7b (to be referred to simply as motors 7a, 7b hereinafter) for driving the wiper arms 1a, 1b to swing respectively. As shown in FIG. 2, each of the motors 7a, 7b has a motor main body 8 and a speed reduction mechanism 9. The motor main body 8 has a motor housing 10 that substantially shows a profile of a bottomed cylinder. The speed reduction mechanism 9 has a casing 11, which includes a bearing section 11a, which collectively show a cylindrical profile similar to that of the motor housing 10 and have dimensions substantially the same as those of the motor housing 10, a gear chamber 11b and a communication section 11c. These members are put together by means of a fastening member (not shown) in a state where the open end 10a of the motor housing 10 and the bearing section 11a of the casing 11 are held in contact with each other.

Two permanent magnets 12, 13 are arranged on the inner peripheral surface of the motor housing 10 with the opposite magnetic poles thereof facing each other to produce a magnetic field in the inside of the motor housing 10. An armature 14 is arranged within the magnetic field in the inside of the motor housing 10. The rotary shaft 15 of the armature 14 is rotatably supported by self-aligning type bearings 16, 17. The bearings 16, 17 are arranged respectively on the bottom 10b of the motor housing 10 and in the bearing section 11a.

The armature 14 has an armature core 18 that is provided with a plurality of slots. A copper wire is wound around the armature core 18 through the slots to form an armature coil 19. A commutator 29 is fixed to the shaft at the left side of the armature core 18 in FIG. 2. The commutator 20 includes a trunk section 20a, which is made of resin and rigidly fitted to the rotary shaft 15, and a plurality of commutator segments 20b, which are radially arranged on the periphery of the trunk section and insulated from each other. The commutator segments 20b are connected to the armature coil 19.

A brush holder 21 is arranged in the inside of the bearing section 11a. Two brushes 22, 23 are fitted to the brush holder 21. The brushes 22, 23 are urged toward the commutator segments 20b and contact the commutator segments 20b in the urged state. A power supply terminal 25 is arranged in the communication section 11c and connected to the brushes 22, 23 by way of wires 24. The brushes 22, 23 are supplied with respectively electric currents in opposite directions as an electric current is supplied to the power supply terminal 25 from a control section (not shown).

Since the armature coil 19 is located in a magnetic field, rotary power is generated in the armature 14 according to Fleming's left hand rule as a rectified electric current is made to flow to the armature coil 19 by way of the commutator 20. Thus, the rotary angle, the rotating direction and the rotary speed of the rotary shaft 15 can be controlled by controlling the electric current flowing to the armature coil 19.

The rotary shaft 15 projects into the inside of the gear chamber 11b. The front end section 15a of the rotary shaft 15 is located near the wall surface 26 of the gear chamber 11b that is located away from the motor main body 8. As shown in FIG. 3, two worms 27, 28 that are threaded in opposite directions are formed in the outer peripheral surface of the rotary shaft 15 at a position located in the inside of the gear chamber 11b. Two worm wheels 29, 30 are arranged in the inside of the gear chamber 11b so as to be engaged with the worms 27, 28 respectively. Thus, the worms 27, 28 and the worm wheels 29, 30 constitute a worm gear 31. Pinion gears 32, 33 are arranged so as to be respectively coaxial with the worm wheels 29, 30. The pinion gears 32, 33 are engaged with a drive gear 35 that is a rotary body integral with the output shaft 34 of the speed reduction mechanism 9. Thus, the rotary motion of the rotary shaft 15 is transmitted to the output shaft 34 at a rotary speed that is reduced by the worm gear 31, the pinion gears 32, 33 and the drive gear 35.

The output shafts 34 of the motors 7a, 7b are mechanically linked to the respective wiper shafts 4a, 4b. The wiper shafts 4a, 4b rotate integrally with the respective output shafts 34. As the rotary shaft 15 rotates, the worms 27, 28 are subjected to thrust that acts in the axial direction of the rotary shaft 15 because of the provision of the worm wheels 29, 30. Since the worms 27, 28 are threaded in opposite directions, the thrust is made to act in two opposite directions. As a result, any movement of the rotary shaft 15 in the directions of the thrust is suppressed and hence it is not necessary to arrange any thrust bearing and the like for the rotary shaft 15. While a double reduction gear mechanism formed by the worm gear 31, the pinion gears 32, 33 and the drive gear 35 is used for the speed reduction mechanism 9 of this embodiment, the present invention is by no means limited thereto and a single reduction gear mechanism formed by using only a worm gear or a planetary gear mechanism may alternatively be used.

A printed circuit board 36 is fitted to the wall surface 26 of the casing 11 and arranged so as to extend perpendicularly relative to the rotary shaft 15. A connection terminal 40 located in the communication section 11c is fitted to the printed circuit board 36. Power is supplied and detection signals are transmitted from a control section (not shown) by way of the connection terminal 40.

Two absolute position detecting Hall ICs (magnetism detection elements) 37a, 37b and two relative position detecting Hall ICs 38, 39 are fitted onto the printed circuit board 36 respectively as first sensor and second sensor. Hall ICs that can detect the type of magnetic poles each time they are switched are used for the Hall ICs 37a, 37b. In other words, they can determine if the object of detection is the N-pole or the S-pole. While Hall ICs are used for the relative position detecting sensor in this embodiment, the present invention is by no means limited thereto and an optical encoder realized by using photo-diodes, an infrared sensor or a sensor of some other type may alternatively be used.

A Hall IC is a sensor that transforms a change in the magnetic field into an electric current and emits a pulse signal. The object of detection of a Hall IC needs to be a magnet. A ring-shaped sensor magnet 41 is attached to the bottom of the drive gear 35 along the outer peripheral surface thereof as the object of detection for the absolute position detecting Hall ICs 37a, 37b. The sensor magnet 41 is adapted to rotate integrally with the drive gear 35, and is magnetized to show two poles in the sense of rotation thereof. A multi-polar magnet 42 (to be referred to simply as magnet 42 hereinafter) is fitted to the front end 15a of the rotary shaft 15 as the object of detection for the relative position detecting Hall ICs 38, 39. The magnet 42 is adapted to rotate integrally with the rotary shaft 15, and is magnetized to show six poles in the sense of rotation thereof.

Figure 4:
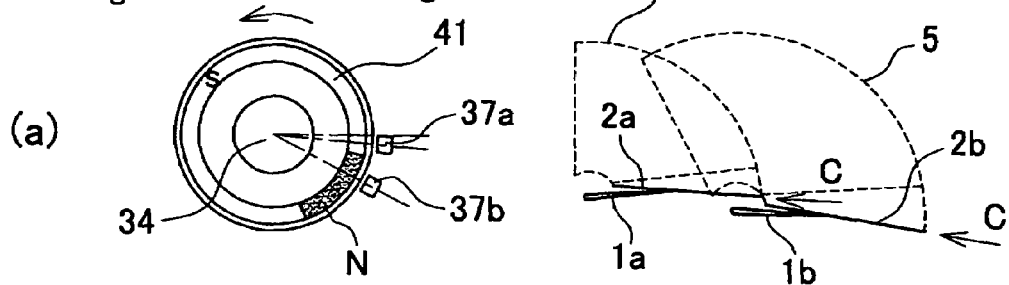
FIG. 4 is a schematic illustration of the positional relationship between the Hall ICs and the sensor magnet.
Figure 4:
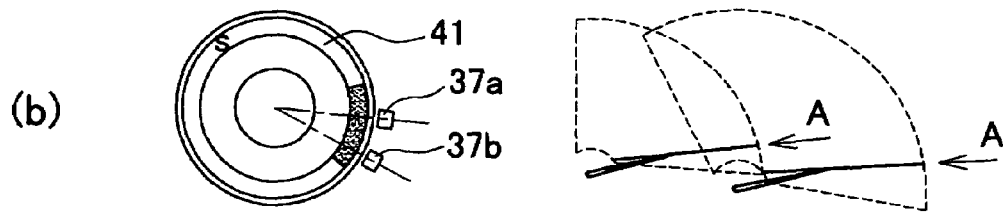
Figure 4:
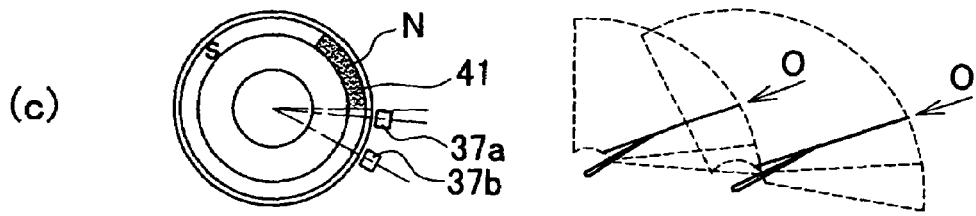
Figure 4:
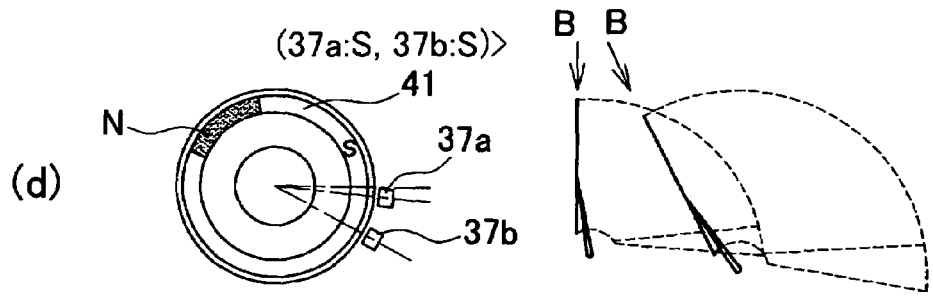

FIG. 4 is a schematic illustration of the positional relationship between the Hall ICs 37a, 37b and the sensor magnet 41.

As shown in FIG. 4, one of the poles (S-pole in the illustrations) of the sensor magnet 41 is made to show a larger angle of magnetization than the other pole (N-pole in the illustrations). As the drive gear 35 rotates, the magnetic poles that passes in front of the Hall ICs 37a, 37b change accordingly. As will be described hereinafter, it is arranged such that the positions of the wiper arms 1a, 1b can be recognized by means of the combination of the changes.

On the other hand, the Hall ICs 38, 39 are fitted to the surface of the printed circuit board 36 at respective positions located opposite the magnet 42 with their phases shifted by 90° in the sense of rotation of the magnet 42. As the rotary shaft 15 rotates and makes a full turn, the Hall ICs 38, 39 output respective pulses for six cycle periods. The pulses are transmitted toward a control section (not shown) by way of the connection terminal 40 so that it is possible to detect the rotary angle of the rotary shaft 15 by counting the pulses. Since the phases of the Hall ICs 38, 39 are shifted by 90° from each other, the sequence of appearance of the pulses transmitted from the Hall ICs 38, 39 varies depending on the sense of rotation of the rotary shaft 15. In other words, it is possible to detect the sense of rotation of the rotary shaft 15 by seeing the sequence of appearance of the pulses. Furthermore, it is possible to detect the rotary speed of the rotary shaft 15 by detecting the cycle period of the pulses detected by the Hall ICs 38, 39.

Now, the operation of the motor will be described below. As a wiper switch (not shown) is turned on, electric currents are supplied from the control section to the brushes 22, 23 in opposite directions and an electric current rectified by the commutator 20 flows to the armature coil 19. Rotary power is generated in the armature coil 19 by the electric current to drive the rotary shaft 15 to rotate. The rotation of the rotary shaft 15 is transmitted to the output shaft 34 at a rotary speed that is reduced by the worm gear 31, the pinion gears 32, 33 and the drive gear 35 of the speed reduction mechanism 9. As the output shaft 34 rotates, the wiper arms 1a, 1b fitted to the respective wiper shafts 4a, 4b swing to operate.

When the wiper arms 1a, 1b are at the respective stored positions, the Hall ICs (magnetism detection elements) 37a, 37b respectively face the S-pole and the N-pole of the sensor magnet 41. Then, the detection signal of the Hall ICs 37a, 37b (i.e., the combined signal from the individual signals of the magnetism detection elements 37a, 37b,) will be "37a: S, 37b: N" as shown in FIG. 4(a). As the output shaft 34 rotates and the wiper arms 1a, 1b get to the respective lower reversal positions, the Hall IC (magnetism detection elements) 37a also comes to face the N-pole of the sensor magnet 41. Then, the detection signal of the Hall ICs 37a, 37b will be "37a: N, 37b: N" as shown in FIG. 4(b). When the output shaft 34 further rotates and the wiper arms 1a, 1b get to the respective origin positions, the magnetic pole that the Hall IC 37a faces is switched from the N-pole to the S-pole of the sensor magnet 41. Then, the detection signal of the Hall ICs 37a, 37b will be "37a: N→S, 37b: S" as shown in FIG. 4(c). When the wiper arms 1a, 1b get to the respective upper reversal positions, both the Hall ICs 37a, 37b face the S-pole of the sensor magnet 41. Then, the detection signal of the Hall ICs 37a, 37b will be "37a: S, 37b: S" as shown in FIG. 4(d).

On the other hand, when the wiper arms 1a, 1b are driven to move respectively from the upper reversal positions toward the lower reversal positions and get to the origin positions, the magnetic pole that the Hall IC 37a faces is switched from the S-pole to the N-pole of the sensor magnet 41. At this time, the detection signal of the Hall ICs 37a, 37b will be "37a: S→N, 37b: S" as shown in FIG. 4(c). The table of FIG. 5 summarily illustrates the above described transitions. As shown in FIG. 5, the combinations of magnetic poles as detected by the Hall ICs (first and second magnetism detection elements) 37a, 37b at the above described control points differ from each other and hence it is possible to know the current positions of the wiper arms 1a, 1b approximately by identifying the current combinations of magnetic poles. Additionally, it is possible to detect the moving direction of the wiper arms 1a, 1b by catching the change of the magnetic pole or poles when the wiper arms 1a, 1b pass the origin positions. In short, the two Hall ICs 37a, 37b can recognize the wiper arms 1a, 1b at four positions. The positions of the magnetic poles including the S-pole and the N-pole of the sensor magnet 41 may be switched.

Assume here that the power supply is turned off when each of the wiper arms 1a, 1b is positioned between the upper reversal position and the lower reversal position. Then, the pulse count of each of the wiper arms 1a, 1b is erased and the positions of the wiper arms 1a, 1b will be unknown when the wiper device is restarted. Then, if the motor is driven to operate once again, the wiper arms can overrun because it is not possible to accurately grasp the positions of the wiper arms 1a, 1b. However, the motor of this embodiment firstly drives the wiper arms 1a, 1b to move toward the respective origin positions O in order to grasp the current positions of the wiper arms 1a, 1b. If the wiper arms 1a, 1b are positioned respectively between the upper reversal positions and the origin positions O, the signal from the Hall ICs 37a, 37b will be "37a: S, 37b: S". If, on the other hand, the signal from the Hall ICs 37a, 37b is other than the combination of "37a: S, 37b: S", the wiper arms 1a, 1b are positioned respectively at the side of the low reversal positions relative to the origin positions O.

Therefore, when the signal of the Hall ICs 37a, 37b is "37a: S, 37b: S", the wiper arms 1a, 1b respectively pass the origin positions O without fail if they are driven to move toward the sides of the lower reversal positions. When, on the other hand, the signal of the Hall ICs 37a, 37b is other than "37a: S, 37b: S", the wiper arms 1a, 1b respectively pass the origin positions O without fail if they are driven to move toward the sides of the upper reversal positions. In other words, it is possible to determine the positions of the wiper arms 1a, 1b relative to the origin positions O by examining the combination of the signals from the two Hall ICs 37a, 37b. Then, the wiper arms 1a, 1b pass the respective origin positions O without fail and therefore their position can be identified by driving the wiper arms 1a, 1b to start moving toward the origin positions O.

After identifying the positions of the wiper arms 1a, 1b at the time when they pass the respective origin positions, their movements are controlled by the ordinary pulse count process. More specifically, the control section starts counting the pulses of the Hall ICs 38, 39 by using the origin position O as base point and detects the rotary angle of the output shaft 34 on the basis of the counted number of pulses. If the wiper arms 1a, 1b are moving toward the respective upper reversal positions B, the movement of the arms 1a, 1b toward the upper reversal positions B, that is, the moving directions of the arm 1a, 1b are detected by seeing the sequence of appearance of the pulses transmitted from the Hall ICs 38, 39 or the change in the signal from the Hall IC 37a at the origin positions O. Then, the absolute positions of the wiper arms 1a, 1b are detected from the rotary angle and the sense of rotation of the output shaft 34.

As the wiper arms 1a, 1b keep on moving and the predetermined number of pulses are counted, the control section recognizes that the wiper arms 1a, 1b are at the respective upper reversal positions B. Accordingly, the directions of the electric currents being supplied to the brushes 22, 23 are switched. As the electric currents being supplied to the brushes 22, 23 are switched, the direction of the rotary power being generated in the armature coil 19 is reversed and the motor starts rotating in the opposite direction. As the rotation of the motor is reversed, the wiper arms 1a, 1b switch their moving directions at the upper reversal positions B and start moving toward the lower reversal positions A.

Thereafter, as the wiper arms 1a, 1b pass the respective origin positions O, the signal from the Hall IC 37a comes to be S→N and the pulse count of the Hall ICs 38, 39 is reset. Then, the pulse count is restarted for the movements of the wiper arms 1a, 1b toward the lower reversal positions A and, when a predetermined number of pulses are counted, the control section recognizes that the wiper arms 1a, 1b are at the respective lower reversal positions A. Accordingly, the motor starts rotating in the opposite direction once again and the wiper arms 1a, 1b start moving toward the upper reversal positions B. As the above movements are repeated, the wiper arms 1a, 1b swing respectively between the lower reversal positions A and the upper reversal positions B for wiping operations by the wiper blades 2a, 2b.

When the wiper switch (not shown) is turned off and it is detected that the wiper arms 1a, 1b come to the respective lower reversal positions A for the first time after the turning-off of the wiper switch, the control section drives the wiper arms 1a, 1b to move respectively from the lower reversal positions A to the storage sections 6. The pulse counting operation of the Hall ICs 38, 39 is continued during the above described movements and, when a predetermined number of pulses are counted, the control section recognizes that the wiper arms 1a, 1b arrive at the respective stored positions C and stops the supply of electric current to the brushes 22, 23.

Thus, if the wiper arms 1a, 1b abnormally stop because of a power shut down or some other reason, the electric motors of this embodiment operate in such a way that the wiper arms 1a, 1b are forced to firstly pass the respective origin positions O without fail at the time of restarting after the abnormal stop. Then, the data are reset when the wiper arms 1a, 1b pass the respective origin positions O and subsequently they are driven to move toward the upper or lower reversal positions. Thus, it is possible to prevent a situation where it cannot recognize the current position of the arm at the time of restarting after the abnormal stop and the wiper arms 1a, 1b overrun and hit the respective stoppers from taking place and to realize a smooth restarting operation. The number of sensors required for the above-described arrangement is limited to only two, which are the Hall ICs 37a, 37b. Thus, it is possible to reduce the number of sensors and the manufacturing cost of the product.

Second Embodiment

Figure 6:
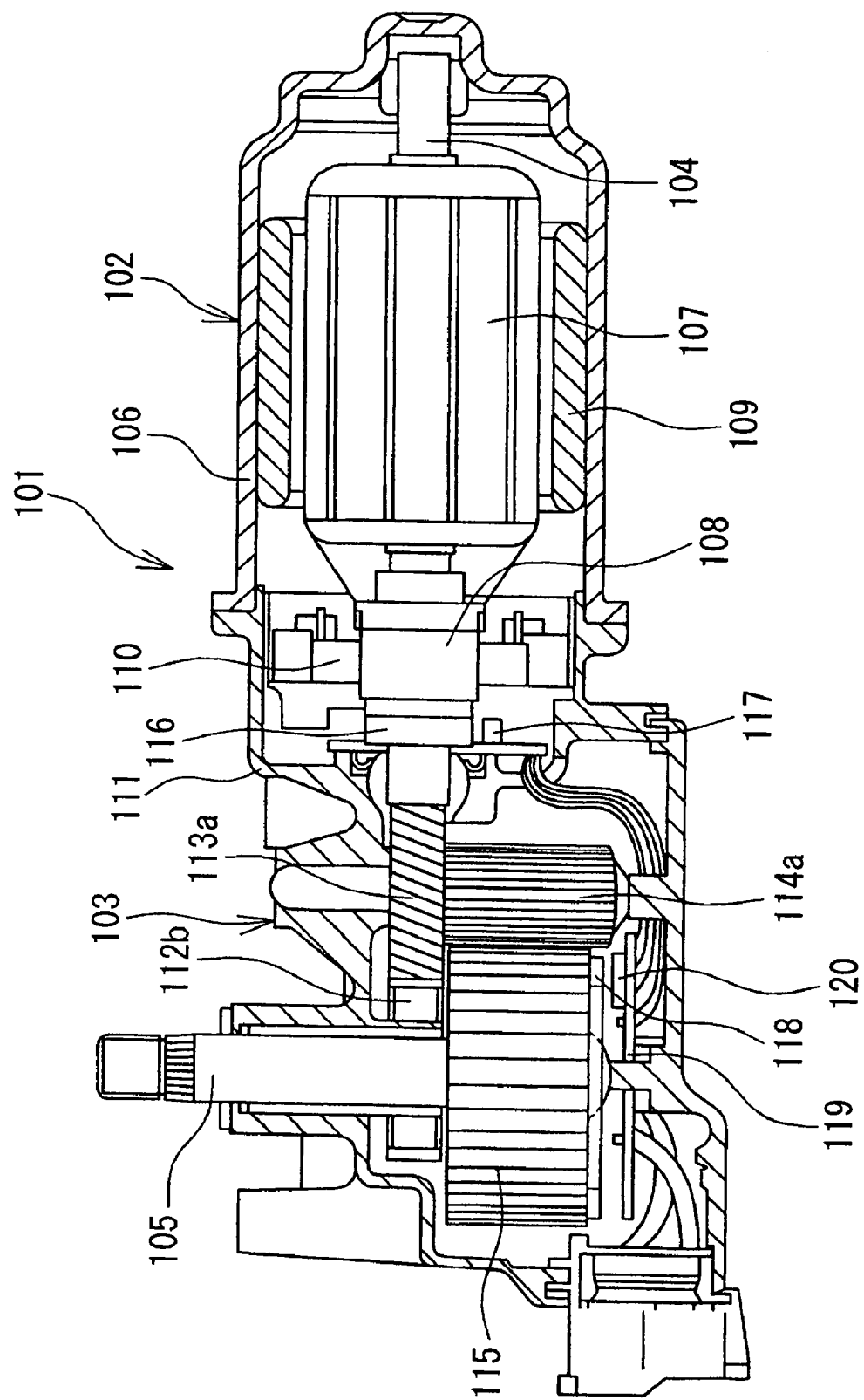
FIG. 6 is a schematic cross sectional view of a motor unit that is used for a wiper device to which a control method according to the invention is applicable.

FIG. 6 is a schematic cross sectional view of a motor unit that is used for a wiper device to which a control method according to the invention is applicable. The motor unit 101 of FIG. 6 is adapted to be used as drive source of a wiper device of an automobile. When the wiper blade of the wiper device (to be referred to simply as blade hereinafter) gets to the upper and lower reversal positions, the sense of rotation of the motor unit 101 is switched.

The motor unit 101 comprises a motor 102 and a gear box 103. The rotation of the rotary shaft 104 of the motor 102 is reduced in the gear box 103 and output by way of an output shaft 105. The rotary shaft 104 is rotatably borne by a yoke 106 showing a profile of a bottomed cylinder. An armature core 107 around which a coil is wound and a commutator 108 are fitted to the rotary shaft 104. A plurality of permanent magnets 109 are rigidly secured to the inner surface of the yoke 106. A feed brush 110 is held in contact with the commutator 108. The speed of the motor 102 (the number of revolutions per unit time) is controlled by way of the intensity of the electric current supplied to the brush 110.

Figure 7:
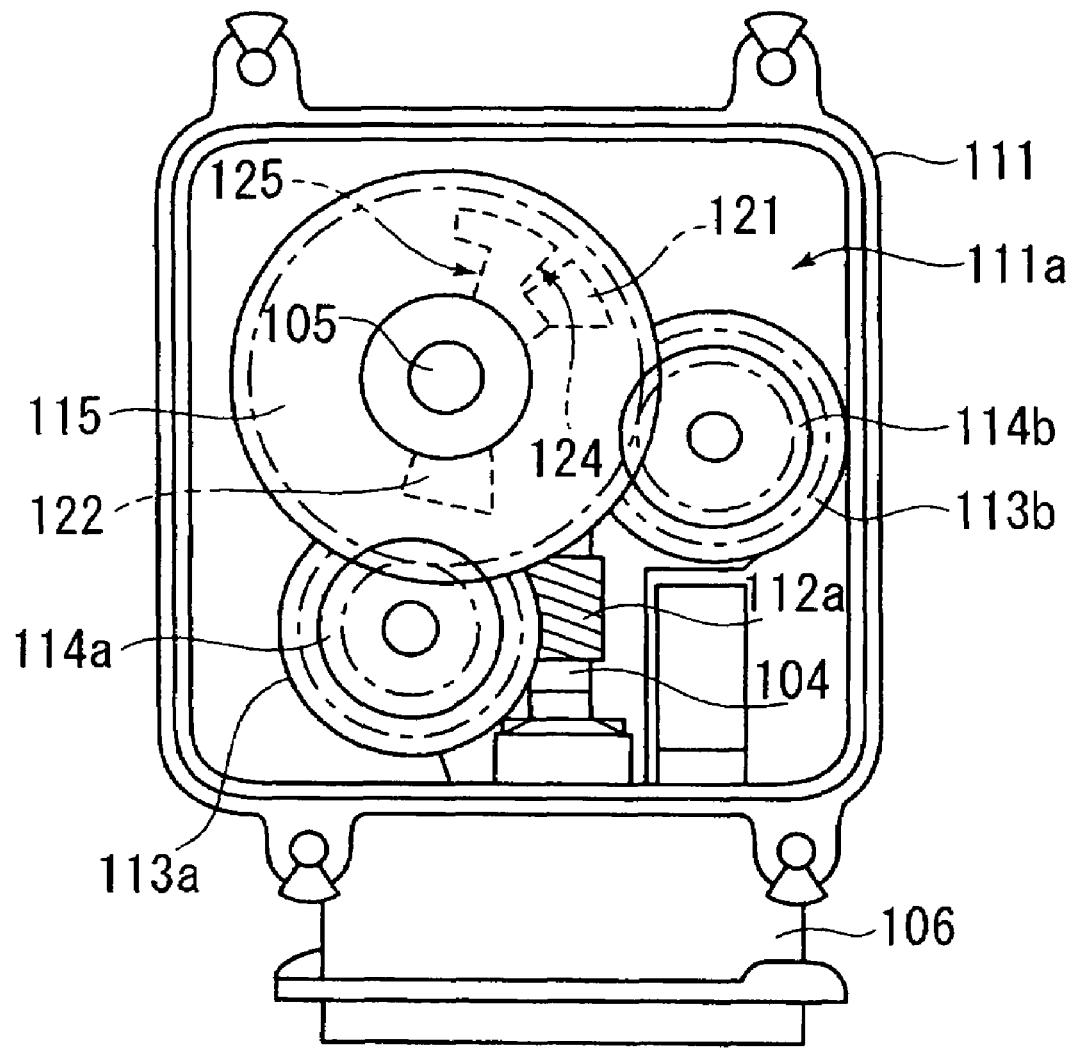
FIG. 7 is a schematic illustration of the inside of the case frame of the motor unit of FIG. 6 as viewed from above.
Figure 8:
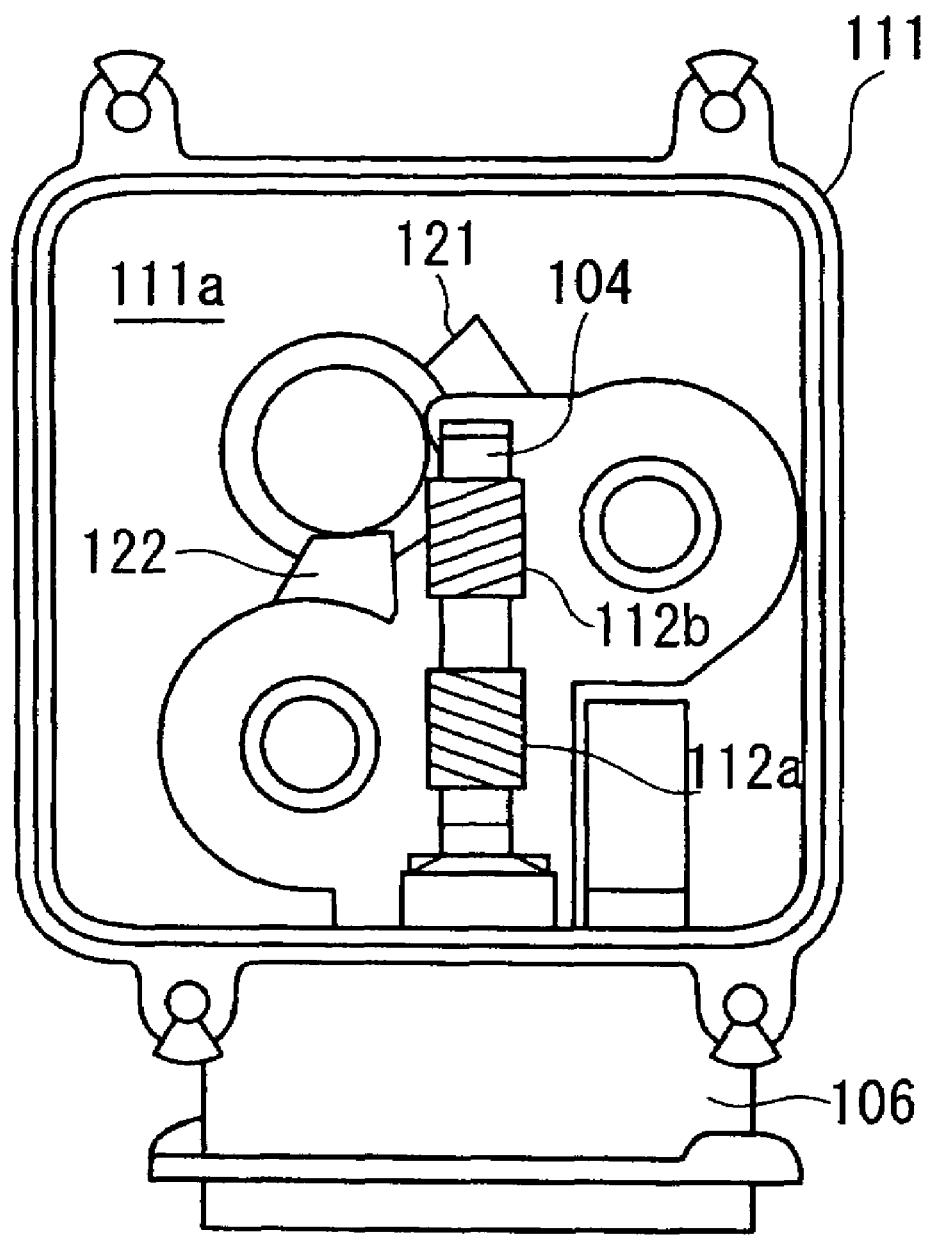
FIG. 8 is a schematic illustration of the inside of the case frame of the motor unit similar to FIG. 7 but without the gear in the gear box.

Case frame 111 of the gear box 103 is fitted to the peripheral edge of the open end of the yoke 106. FIG. 7 is a schematic illustration of the inside of the case frame 111 of the motor unit of FIG. 6 as viewed from above. FIG. 8 is a schematic illustration of the inside of the case frame 111 of the motor unit similar to FIG. 7 but without the gear in the gear box 103. The front end of the rotary shaft 104 of the motor unit that projects from the yoke 106 is contained in the case frame 111. Worms 112a, 112b are formed at the front end of the rotary shaft 104. The worms 112a, 112b are engaged respectively with worm gears 113a, 113b that are rotatably supported by the case frame 111. Small diameter first gears 114a, 114b are integrally and coaxially formed with the respective worm gears 113a, 113b. The first gears 114a, 114b are engaged with a large diameter second gear 115. An output shaft 105 is integrally fitted to the second gear 115 and rotatably borne by the case frame 111.

The drive power of the motor 2 is transmitted to the output shaft 105 at a reduced rotary speed by way of the worms 112a, 112b, the worm gears 113a, 113b, the first gears 114a, 114b and the second gear 115. The link mechanism (not shown) of the wiper device is connected to the output shaft 105. As the electric motor 102 is driven to operate, the link member is by turn driven by way of the output shaft 105 and cooperates with the other link members in an interlocked manner to drive the wiper arm to move.

Figure 9:
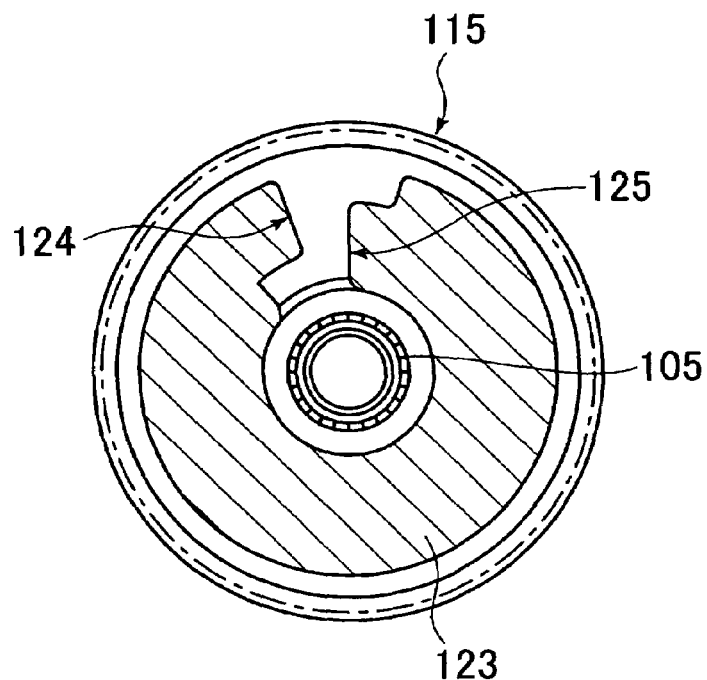
FIG. 9 is a schematic illustration of the configuration of the second gear of the motor unit of FIG. 6.

Stoppers 121, 122 project from the bottom surface 111a of the case frame 111 for the purpose of restricting the rotary angle of the second gear 115. The second gear 115 is provided with a guide groove 123 that matches the stoppers 121, 122. FIG. 9 is a schematic illustration of the configuration of the second gear 115. The guide groove 123 is formed to extend along the circumference of the second gear 115 and is illustrated as a hatched area in FIG. 9. The stoppers 121, 122 are contained in the guide groove 123. The opposite ends of the guide groove 123 are walls that operate as respective rotation restricting sections 124, 125. As the second gear 115 rotates and the rotation restricting section 124 hits the stopper 121, the blade is mechanically restricted so that it cannot move downward any further. Similarly, as the rotation restricting section 125 hits the stopper 122, the blade is mechanically restricted so that it cannot move upward any further.

Figure 10:
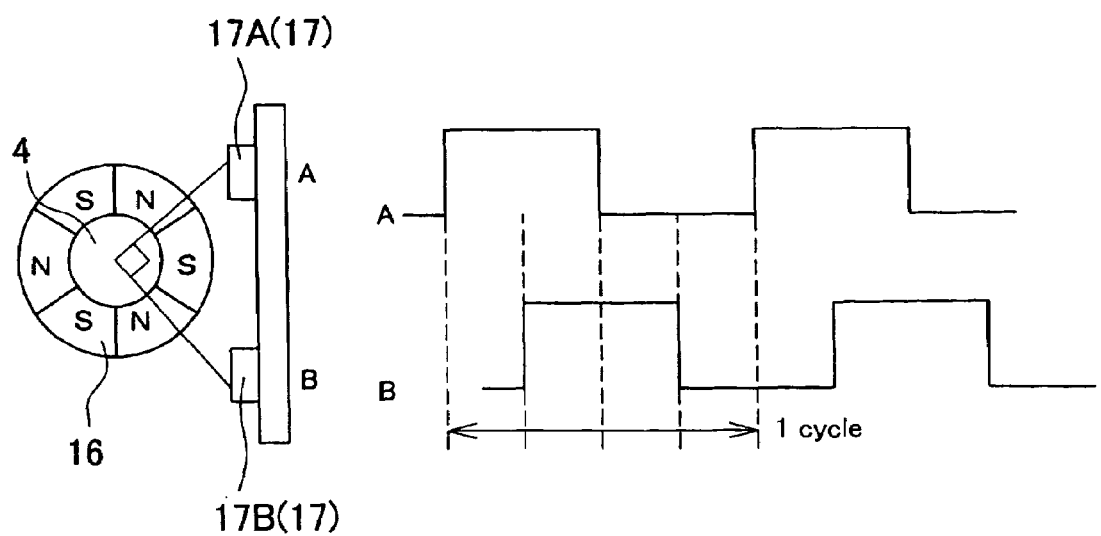
FIG. 10 is a schematic illustration of the relationship between the magnet and the Hall ICs and the output signal (motor pulse) of the Hall ICs.

A multi-polar magnet 116 (to be referred to simply as magnet 116 hereinafter) is fitted to the rotary shaft 104 and Hall ICs 117 are arranged in the case frame 111 so as to face the outer periphery of the magnet 116. FIG. 10 is a schematic illustration of the relationship between the magnet 116 and the Hall ICs 117 and the output signal (motor pulse) of the Hall ICs 117. As shown in FIG. 10, the two Hall ICs 117 (117A, 117B) are arranged at positions that form a 90° angle relative to the center of the rotary shaft 104. Since the magnet 116 is magnetized to show six poles, as the rotary shaft 104 rotates and makes a full turn, the Hall ICs 117 output respective pulses for six cycle periods.

As shown at the right side in FIG. 10, the pulse signals output from the Hall ICs 117A, 117B show a phase difference of ¼ of a cycle period. Therefore, it is possible to determine the sense of rotation of the rotary shaft 104 by detecting the timings of appearance of the pulses from the Hall ICs 117A, 117B so that consequently it is possible to determine if the wiper arm is moving forward or backward. Additionally, it is possible to detect the rotary speed of the rotary shaft 104 from the cycle period of the pulse output of one of the Hall ICs 117A, 117B. The number of revolutions per unit time of the rotary shaft 104 and the moving speed of the wiper blade show a correlation that is determined as a function of the reduction ratio and the working ratio of the link so that it is possible to computationally determine the moving speed of the blade on the basis of the number of revolutions per unit time of the rotary shaft 104.

A ring magnet 118 (to be referred to simply as magnet 118 hereinafter) is fitted to the bottom surface of the second gear 115 for the purpose of detecting the absolute positions of the blade. A printed circuit board 119 is fitted to the case frame 111 and a Hall IC 120 is arranged on the printed circuit board 119 and opposite the magnet 118. As described above, the crank arm is fitted to the second gear 115 so as to rotate by about 180° when the blade is driven to reciprocate for a wiping operation. As the second gear 115 rotates and the blade gets to a predetermined origin position O, the Hall IC 120 squarely faces the magnet 118 and an origin position reset signal is output.

Figure 11:
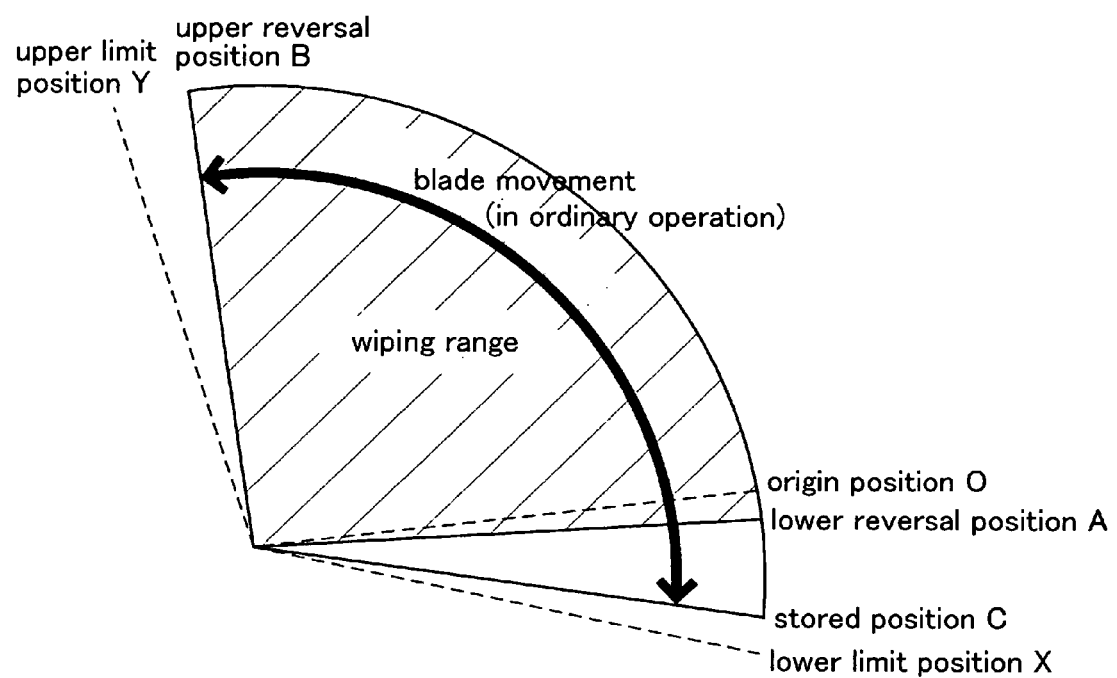
FIG. 11 is a schematic illustration of the moving range of the wiper blade of the wiper device.

Thus, the blade is driven by the motor unit 101 to swing between a lower reversal position A and an upper reversal position B and operate for wiping away the rain drops or snow flakes adhering to the windshield of the automobile. FIG. 11 is a schematic illustration of the moving range of the blade. During the wiping operation, the blade reciprocates between the upper and lower reversal positions A and B, or within the wiping range hatched in FIG. 11. The blade moves from the lower reversal position A to the upper reversal position B when the motor is driven to turn forward, whereas it moves from the upper reversal position B to the lower reversal position A when the motor is driven to turn backward. When the wiper is at rest, the blade is moved to a stored position C that is located below the lower reversal position A and stored in the storage section. The storage section is arranged in the inside of the bonnet (not shown) of the body of the automobile.

Figure 12:
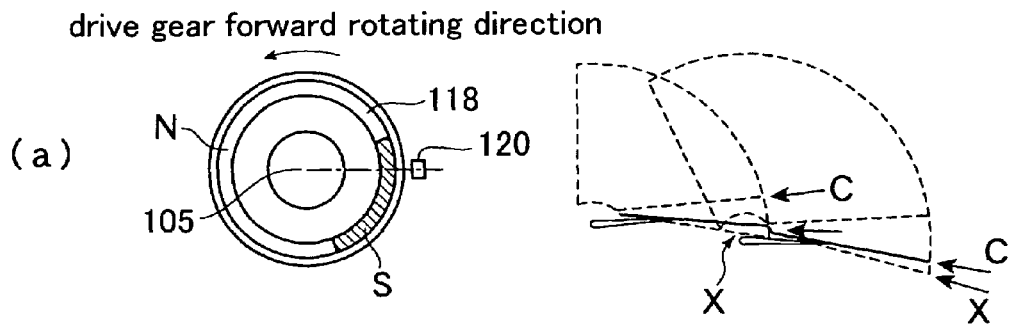
FIG. 12 is a schematic illustration of the positional relationship between the Hall ICs and the magnet.
Figure 12:
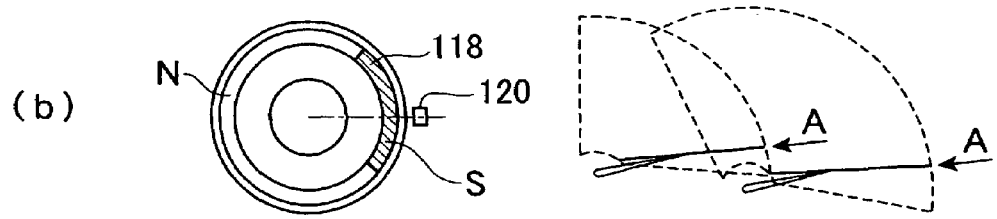
Figure 12:
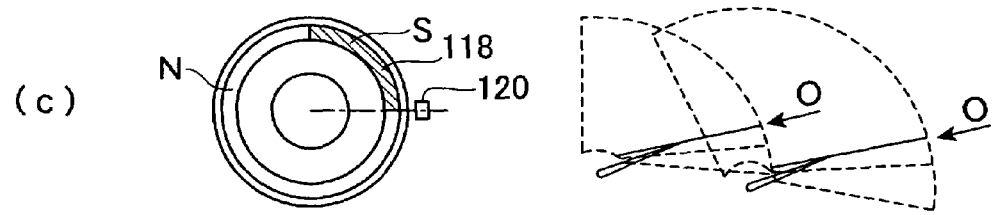
Figure 12:
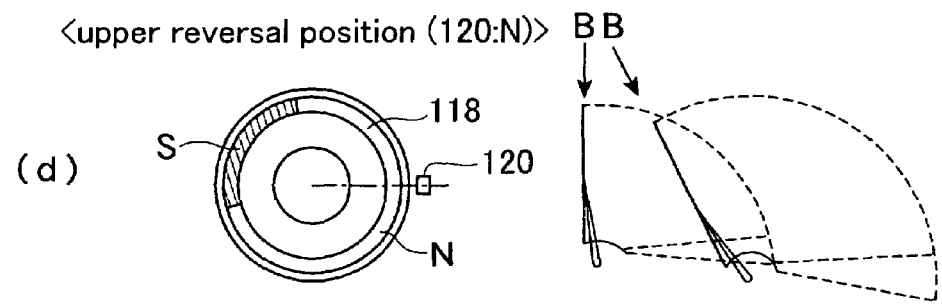

An origin position (reference position) O is arranged at a position substantially at the middle of the wiping range and slightly close to the lower reversal position A. An origin position reset signal is output from the Hall IC 120 when the blade is positioned at the origin position O. FIG. 12 is a schematic illustration of the positional relationship between the Hall IC 120 and the magnet 118. The magnet 118 has two poles as shown in FIG. 12. When the blade comes to the origin position O, there arises a change in the polarities of the magnet 118 (S→N when forwardly rotating, N→S when backwardly rotating) and an origin position reset signal is output from the Hall IC 120.

The origin position reset signal is used as a reference signal that indicates the absolute position of the blade. When an origin position reset signal is obtained, it is judged that the blade just passes the origin position O shown in FIG. 11. On the other hand, the motor pulses from the Hall IC 117 are used as signals indicating the relative position of the blade. The output motor pulses are proportional to the rotary angle of the rotary shaft 4 and the pulse count value (accumulated number) thereof corresponds to the angle by which the rotary shaft 4 rotates. Thus, it is possible to know the extent by which the blade has moved from the origin position O by resetting the pulse count value to reference value (zero) when an origin position reset signal is obtained and counting the motor pulses after the resetting.

Meanwhile, a lower limit position X and an upper limit position Y are formed respectively at the outside of the stored position C and at the outside of the upper reversal position B by the stoppers 121, 122 and the guide groove 123 as limits of mechanical motion. The lower limit position X and the upper limit position Y define mechanical limits and hence are located at respective positions that are always separated from the origin position O by predetermined distances (angles). In other words, when the blade gets to the lower limit position X or the upper limit position Y, the pulse count value from the origin position O always shows a constant value. Therefore, it is possible to use the lower limit position X and/or the upper limit position Y as position for resetting the pulse count value just like the origin position O.

In this embodiment of wiper device control method according to the invention, the lower limit position X is used as pulse count value correcting position in addition to the origin position O. Firstly, when the blade is at the stored position C, the Hall IC 120 is located opposite the S-pole of the magnet 118 and hence the detection signal of the Hall IC 120 indicates "S" as shown in FIG. 12($a$). As the output shaft 105 is rotated and the blade reaches the lower reversal position A, the detection signal also indicates "S" as shown in FIG. 12($b$). As the output shaft 105 is rotated further and the blade reaches the origin position O, the Hall IC 120 gets to the boundary point of the magnetic poles of the magnet 118 so that the detection signal of the Hall IC 120 comes to indicate "S→N" as shown in FIG. 12($c$). Further, when the blade exceeds the origin position O, the Hall IC 120 is located opposite the N-pole of the magnet 118 and hence the detection signal of the Hall IC 120 indicates "N". When the blade gets to the upper reversal position B, the Hall IC 120 is located opposite the N-pole of the magnet 118 and hence the detection signal of the Hall IC 120 indicates "N" as shown in FIG. 12($d$).

On the other hand, when the blade moves from the upper reversal position B to the lower reversal position A, the detection signal of the Hall IC 120 indicates "N" while the blade is moving between the upper reversal position B and the origin position O but comes to indicate "N→S" when the blade gets to the origin position O. Once the blade moves beyond the origin position O, the detection signal of the Hall IC 120 comes to indicate "N". The detection signal of the Hall IC 120 still indicates "N" when the blade is positioned at the lower reversal position A or at the stored position C. The table of FIG. 13 summarily illustrates the above-described transitions. As seen from FIG. 13, it is possible to detect the moving direction of the blade by seeing the change in the magnetic polarity of the magnet 118 when the blade passes the origin position O. It will be appreciated that the site of the S-pole and that of the N-pole of the magnet 118 may be switched.

Assume here that the power supply switch is turned off when the blade is positioned between the origin position O and the upper reversal position B. The signal from the Hall IC 120 indicates "N" when the blade is positioned between B and O. Thus, if the signal indicates "N" when power is supplied once again, the blade is positioned in the area between B and O. Therefore, the wiper device of this embodiment firstly drives the blade to move backwardly toward the origin position O in order to grasp the current position of the blade. If the blade is driven to move backwardly when it is positioned between B and O, it passes the origin position thereafter without fail. In other words, when the motor 102 is driven to rotate backwardly while the initial signal from the Hall IC 120 indicates "N", it is possible to obtain an origin position reset signal thereafter without fail. Once the origin position reset signal is obtained, it is possible to accurately grasp the current position of the blade.

Assume now that the power supply switch is turned off when the blade is positioned at the side of the stored position C relative to the origin position O. The signal from the Hall IC 120 indicates "S" when the blade is positioned between O and C. When the power supply switch is turned on once again and the signal indicates "S", the blade is positioned in the area. As pointed out above, the lower limit position X is also used as pulse count value correcting position in the wiper device of this embodiment. Therefore, it is possible to reliably grasp the current position of the blade when the blade is positioned in the area and the motor is restarted regardless if the motor is driven to rotate forwardly or backwardly.

If the motor 102 is driven once again to rotate forwardly and the blade that is positioned between O and C is driven to move forwardly, the blade passes the origin position thereafter without fail. Therefore, it is possible to accurately grasp the current position of the blade by acquiring an origin position reset signal. If, on the other hand, the motor 102 is driven once again to rotate backwardly and the blade that is positioned between O and C is driven to move backwardly, the blade gets to the lower limit position X thereafter without fail. The pulse count value at the lower limit position X is defined to be a predetermined known value. Therefore, it is possible to accurately grasp the current position of the blade by resetting the pulse count value to this reproduced value.

The wiper device of this embodiment may be arranged such that the pulse count value is appropriately corrected by using the lower limit position X so as not to produce any discrepancies due to a repeated reciprocating motion when the blade is positioned between the lower reversal position A and the stored position C. Either of two techniques may be used to correct the pulse count value for this purpose. With the first technique, the blade is moved to the lower limit position x each time it is operated to move and the pulse count value is reset to the count value of the lower limit position X. While it is possible to accurately grasp the position of the blade because the pulse count value is reset each time with this technique, it accompanies disadvantages including that noises and vibrations can be produced because a mechanical collision occurs repeatedly and such a repeated collision degrades the durability of the wiper device.

With the second technique, the pulse count value is reset when large discrepancies seem to arise in the pulse. In the wiper device of this embodiment, when an angular deviation occurs to the blade toward the stored position C, the blade eventually gets to the lower limit position X as the deviation increases and the pulse count value is automatically corrected there. Conversely, when an angular deviation occurs to the blade toward the lower reversal position A, the blade eventually gets to the origin position O as the deviation increases and the pulse count value is automatically reset there. However, such a resetting operation at the origin position O is disadvantageous to the wiper device from the control point of view because the blade is driven to move beyond the lower reverse position A.

For this reason, when an angular deviation occurs to the blade toward the lower reversal position A and the pulse count shows a value corresponding to a position located beyond the lower reversal position A and at the side of the origin position O, it is judged that there are pulse discrepancies and the blade is driven to move to the lower limit position X. In other words, if the pulse count value indicates a position beyond the lower reversal position A, although the blade is supposed to be moving between the lower reversal position A and the stored position C, it is safe to judge that pulse discrepancies have taken place so that the pulse count value is reset at the lower limit position X.

In this way, with the wiper device of this embodiment, when the blade abnormally stops because of a power shut down or some other reason, it is possible to reset the pulse count value, utilizing the origin position O or the lower limit position X, when the blade is started to move once again from the abnormally stopped state. Therefore, the wiper device of this embodiment is free from a situation where it cannot recognize the current position of the blade when the blade is started to move once again from an abnormally stopped state and an overrun takes place at the upper reversal position B and hence the blade is started to move once again very smoothly. Additionally, the pulse discrepancies that take place when the blade is moving between the lower reversal position A and the stored position C can be corrected accurately to make it possible to drive the blade to reciprocate very smoothly. Only a single sensor, or a Hall IC 120, is required for the above-described operation of correctly driving the blade in the wiper device of this embodiment. Thus, it is possible to reduce the number of sensors and the manufacturing cost of the product.

The present invention is by no means limited to the above-described embodiments, which may be modified and altered in various different ways without departing from the scope of the invention.

For example, in each of the above described embodiments, an electric motor according to the invention is applied to a wiper device of an automobile, the present invention is by no means limited thereto and it can find applications in the field of other car accessories such as power windows and also in the field of home electric appliances. While the two wiper arms are driven to move respectively by means of the two different motors 7a, 7b in the above described first embodiment, it is possible to drive the two wiper arms 1a, 1b to move by means of a single electric motor and a link mechanism. While the present invention is applied to a parallel wiping type wiper device in each of the above described embodiments, the present invention can also be applied to an opposite type wiper device. It should be noted here that the magnetic poles (N, S) of the ring-shaped sensor magnet 41 of the first embodiment may be inversely arranged. Then, the magnetic poles detected by the Hall ICs 37a, 37b are opposite to those illustrated in FIGS. 4 and 5.

Figures 13, 14:
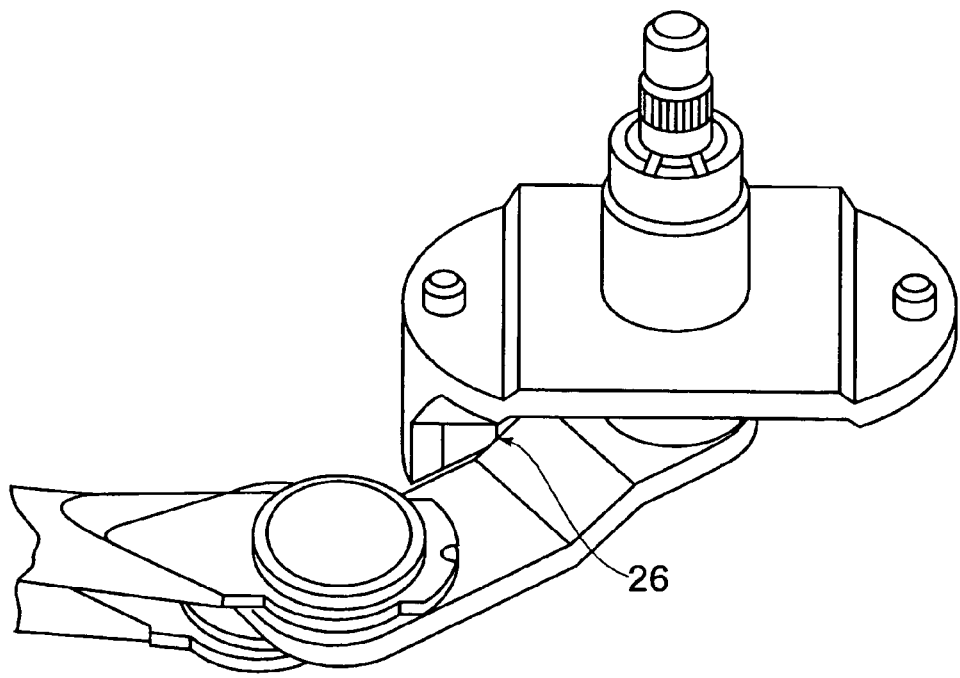
FIG. 13 is a table illustrating the combinations of magnetic poles that the Hall ICs detect respectively at corresponding control points.
FIG. 14 is a schematic illustration of another example of definition of a mechanical restricting position.

The setting of mechanically restricting positions is not limited to the use of stoppers 121, 122 and a guide groove 123 as described above. For example, the rotary angle of the second gear 115 may be restricted by the engagement of a pin that is arranged to project from the case frame 111 and a groove that is formed to contain the pin in the second gear 115. As shown in FIG. 14, a rotary restricting section 126 for restricting swing angle is provided in the link mechanism, and accordingly, a mechanical limit position may be set.

Thus, according to the invention, in a wiper device control method for detecting the position of the wiper arm, using the state where the arm is positioned at the reference position as original position, and driving the wiper arm to reciprocate between an upper reversal position and a lower reversal position for a wiping operation, when the wiper arm stops between the upper reversal position and the lower reversal position in operation, it is always started to move toward the reference position at the time of restarting. Thus, if the wiper arm abnormally stops between the upper reversal position and the lower reversal position because of a power shut down or some other reason, it is forced to firstly pass the reference position without fail at the time of restarting. Therefore, it is possible to accurately grasp the wiper arm position. Thus, it is possible to prevent the blade from overrunning and any of the mechanical components of the wiper device from colliding with the stoppers when the blades are restarted.

According to the invention, a wiper device comprises a sensor magnet having a first magnetic pole and a second magnetic pole. Both first and second magnetism detection elements are located opposite the second magnetic pole (e.g., the S-pole) when a wiper arm is at the side of an upper reversal position relative to a reference position, and at least the first magnetism detection element or the second magnetism detection element is located opposite the first magnetic pole (e.g., the N-pole) when the wiper arm is at the side of a lower reversal position relative to the reference position. Thus, it is possible to judge if the wiper arm is at the side of the upper reversal position or at the side of the lower reversal position relative to the reference position by determining the polarity of the first magnetic pole and that of the second magnetic pole by means of the first and second magnetism detection elements. As a result, if the wiper arm abnormally stops between the upper reversal position and the lower reversal position because of a power shut down or some other reason, it is possible to force the wiper arm to firstly pass the reference position without fail at the time of restarting and to accurately determine the position of the wiper arm by the two magnetism detection elements. Then, it is possible to reduce the number of magnetism detection elements and hence the cost of manufacturing the device.

According to the invention, in a wiper device control method for driving the wiper arm to reciprocate between an upper reversal position and a lower reversal position for a wiping operation, a reference position and a lower limit position for mechanically restricting the operation of the wiper arm are arranged respectively between the upper reversal position and the lower reversal position and below the stored position and, when the wiper arm stops in operation, it is always started to move toward the lower limit position at the time of restarting. Thus, if the wiper arm abnormally stops at any position, it is forced to pass the reference position or get to the lower limit position without fail after the time of restarting. Therefore, it is possible to accurately grasp the wiper arm position at the time of restarting by detecting the passage through the reference position or the arrival to the lower limit position of the wiper arm.

For example, in a control system where the wiper arm is driven by an electric motor and the wiper arm position is detected by means of the count value of the pulse signal output as a result of the rotary motion of the motor to control the operation of the wiper arm, the passage through the reference position of the wiper arm is detected by a sensor. On the other hand, the arrival to the lower limit position gives rise to mechanical restrictions and the count value of the pulse signal at that time shows a predetermined known value. In other words, with the above described control method, the position of the wiper arm at the time of restarting can be grasped by means of a single sensor that is arranged at the reference position. Then, it is possible to reduce the number of sensors to a minimally necessary number and hence the cost of manufacturing the device.

The invention claimed is:

1. A method for controlling a wiper device, driving a wiper arm by means of a motor to reciprocate between an upper reversal position and a lower reversal position for a wiping operation and controlling the operation of the wiper device by detecting the wiper arm position by means of the count value of the pulse signal output as a result of the rotary motion of the motor, wherein
   a reference position for resetting the count value of the pulse signal to a reference value, arranged between the upper reversal position and the lower reversal position;
   a stored position for holding the wiper arm at rest when the wiper arm is stopped, arranged below the lower reversal position;
   a lower limit position for mechanically restricting the operation of the wiper arm and causing the count value of the pulse signal to show a predetermined value, arranged below the stored position; and,
   when the wiper arm stops in operation between the upper reversal position and the reference position, it is always started to move toward the reference position at the time of restarting and the count value of the pulse signal is reset to the reference value as the wiper arm passes the reference position;
   when the wiper arm stops in operation between the reference position and the stored position, it is started either toward the reference position or the lower limit position at the time of restarting and the count value of the pulse signal is reset to the reference value or the predetermined value as the wiper arm passes the reference position or arrives at the lower limit position, whichever appropriate.

2. A method for controlling a wiper device, driving a wiper arm by means of a motor to reciprocate between an upper reversal position and a lower reversal position for a wiping operation and controlling the operation of the wiper device by detecting the wiper arm position by means of the count value of the pulse signal output as a result of the rotary motion of the motor, wherein
   a reference position for resetting the count value of the pulse signal to a reference value, arranged between the upper reversal position and the lower reversal position;
   a stored position for holding the wiper arm at rest when the wiper arm is stopped, arranged below the lower reversal position;
   a lower limit position for mechanically restricting the operation of the wiper arm and causing the count value of the pulse signal to show a predetermined value, arranged below the stored position; and,
   when the wiper arm is driven to reciprocate between the lower reversal position and the stored position, it is moved to the lower limit position for operation in each go and return cycle and the count value of the pulse signal is reset to the predetermined value in response to the arrival of the wiper arm to the lower limit position.

3. A method for controlling a wiper device, driving a wiper arm by means of a motor to reciprocate between an upper reversal position and a lower reversal position for a wiping operation and controlling the operation of the wiper device by detecting the wiper arm position by means of the count value of the pulse signal output as a result of the rotary motion of the motor, wherein
   a reference position for resetting the count value of the pulse signal to a reference value, arranged between the upper reversal position and the lower reversal position,
   a stored position for holding the wiper arm at rest when the wiper arm is stopped, arranged below the lower reversal position;
   a lower limit position for mechanically restricting the operation of the wiper arm and causing the count value of the pulse signal to show a predetermined value, arranged below the stored position; and,
   when the wiper arm is driven to reciprocate between the lower reversal position and the stored position and if the count value of the pulse signal shows a value indicating as if the wiper arm were positioned at the side of the reference position beyond the lower reversal position, the wiper arm is moved to the lower limit position and the count value of the pulse signal is reset to the predetermined value in response to the arrival of the wiper arm to the lower limit position.

4. A wiper device to be driven by an electric motor including a motor main body having a rotary shaft, and a speed reduction mechanism for reducing a number of revolutions of the rotary shaft and transmitting the revolutions of the rotary shaft to an output shaft, said wiper device comprising:

a wiper arm to be connected to the output shaft and operable to reciprocate between an upper reversal position and a lower reversal position during a wiping operation;

a first magnetism detection element to be located opposite a predetermined position of the output shaft when said wiper arm is at a reference position;

a second magnetism detection element to be located at a position spaced from said first magnetism detection element by a predetermined angle;

a sensor magnet to be located at the output shaft, said sensor magnet having a first magnetic pole and a second magnetic pole arranged in a peripheral direction and having different polarities, said first magnetism detection element and said second magnetism detection element being located opposite said second magnetic pole when said wiper arm is at a side of said upper reversal position relative to said reference position, at least one of said first magnetism detection element and said second magnetism detection element being located opposite said first magnetic pole when said wiper arm is at a side of said lower reversal position relative to said reference position, said first magnetism detection element being located opposite a boundary between said first magnetic pole and said second magnetic pole when said wiper arm is located at said reference position; and a sensor for detecting a rotary angle of the rotary shaft, said sensor being operable to start detecting the rotary angle of the rotary shaft at a time when said wiper arm is at said reference position.

5. A wiper device to be driven by an electric motor including a motor main body having a rotary shaft, and a speed reduction mechanism for reducing a number of revolutions of the rotary shaft and transmitting the revolutions of the rotary shaft to an output shaft, said wiper device comprising:

a wiper arm to be connected to the output shaft and operable to reciprocate between an upper reversal position and a lower reversal position during a wiping operation;

a first magnetism detection element to be located opposite a predetermined position of the output shaft when said wiper arm is at a reference position;

a second magnetism detection element to be located at a position spaced from said first magnetism detection element by a predetermined angle;

a sensor magnet to be located at the output shaft, said sensor magnet having a first magnetic pole and a second magnetic pole arranged in a peripheral direction and having different polarities, said first magnetism detection element and said second magnetism detection element being located opposite said second magnetic pole when said wiper arm is at a side of said upper reversal position relative to said reference position, at least one of said first magnetism detection element and said second magnetism detection element being located opposite said first magnetic pole when said wiper arm is at a side of said lower reversal position relative to said reference position, both said first magnetism detection element and said second magnetism detection element being located opposite said first magnetic pole when said wiper arm is at said lower reversal position; and a sensor for detecting a rotary angle of the rotary shaft, said sensor being operable to start detecting the rotary angle of the rotary shaft at a time when said wiper arm is at said reference position.

6. A wiper device to be driven by an electric motor including a motor main body having a rotary shaft, and a speed reduction mechanism for reducing a number of revolutions of the rotary shaft and transmitting the revolutions of the rotary shaft to an output shaft, said wiper device comprising:

a wiper arm to be connected to the output shaft and operable to reciprocate between an upper reversal position and a lower reversal position during a wiping operation;

a first magnetism detection element to be located opposite a predetermined position of the output shaft when said wiper arm is at a reference position;

a second magnetism detection element to be located at a position spaced from said first magnetism detection element by a predetermined angle;

a sensor magnet to be located at the output shaft, said sensor magnet having a first magnetic pole and a second magnetic pole arranged in a peripheral direction and having different polarities, said first magnetism detection element and said second magnetism detection element being located opposite said second magnetic pole when said wiper arm is at a side of said upper reversal position relative to said reference position, at least one of said first magnetism detection element and said second magnetism detection element being located opposite said first magnetic pole when said wiper arm is at a side of said lower reversal position relative to said reference position, a wiper arm stored position being located below said lower reversal position, said first magnetism detection element being located opposite said first magnetic pole and said second magnetism detection element being located opposite said second magnetic pole when said wiper arm is at said stored position; and a sensor for detecting a rotary angle of the rotary shaft, said sensor being operable to start detecting the rotary angle of the rotary shaft at a time when said wiper arm is at said reference position.

7. The wiper device of claim 6, wherein, when said wiper arm stops at a position other than said stored position, said wiper arm is always started to move toward said reference position at a restarting time.

8. A wiper device to be driven by an electric motor including a motor main body having a rotary shaft, and a speed reduction mechanism for reducing a number of revolutions of the rotary shaft and transmitting the revolutions of the rotary shaft to an output shaft, said wiper device comprising:

a wiper arm to be connected to the output shaft and operable to reciprocate between an upper reversal position and a lower reversal position during a wiping operation;

a first magnetism detection element to be located opposite a predetermined position of the output shaft when said wiper arm is at a reference position;

a second magnetism detection element to be located at a position spaced from said first magnetism detection element by a predetermined angle;

a sensor magnet to be located at the output shaft, said sensor magnet having a first magnetic pole and a second magnetic pole arranged in a peripheral direction and having different polarities, said first magnetism detection element and said second magnetism detection element being located opposite said second magnetic pole when said wiper arm is at a side of said upper reversal position relative to said reference position, at least one of said first magnetism detection element and said second magnetism detection element being located opposite said first magnetic pole when said wiper arm is at a side of said lower reversal position relative to said reference position, when said wiper arm stops between said upper reversal position and said lower reversal position in operation, said wiper arm is always started to move toward said reference position at a restarting time; and a sensor for detecting a rotary angle of the rotary shaft, said sensor being operable to start detecting the rotary angle of the rotary shaft at a time when said wiper arm is at said reference position.

9. A method of controlling a wiper arm using a wiper device, the wiper device being driven by an electric motor including a motor main body having a rotary shaft, and a speed reduction mechanism for reducing a number of revolutions of the rotary shaft and transmitting the revolutions of the rotary shaft to an output shaft, said method comprising:
  detecting a position of the wiper arm on the basis of a state in which the wiper arm is positioned at a reference position; and
  driving the wiper arm to reciprocate between an upper reversal position and a lower reversal position for performing a wiping operation;
  wherein the wiper device includes a sensor magnet at the output shaft of the electric motor, the sensor magnet having a first magnetic pole and a second magnetic pole arranged in a peripheral direction and having different polarities, and the wiper device further includes two magnetism detection elements for each detecting a polarity of the sensor magnet and generating respective signals based on the detected polarity; and
  wherein, when the wiper arm stops between the upper reversal position and the lower reversal position during operation, the wiper arm is always started to move toward the reference position at a restarting time based on a combination of the signals generated by the two magnetism detection elements.

10. The method of claim 9, wherein a wiper arm stored position is located below the lower reversal position in the wiper device, and when the wiper arm stops at a position other than the stored position during operation, the wiper arm is always started to move toward the reference position at the restarting time.

11. A wiper device to be driven by an electric motor including a speed reduction mechanism, a motor main body having a rotary shaft, and a speed reduction mechanism for reducing a number of revolutions of the rotary shaft and transmitting the revolutions of the rotary shaft to an output shaft, said wiper device comprising:
  a wiper arm to be connected to the output shaft and operable to reciprocate between an upper reversal position and a lower reversal position during a wiping operation;
  a first magnetism detection element to be located opposite a predetermined position of the output shaft when said wiper arm is at a reference position;
  a second magnetism detection element to be located at a position spaced from said first magnetism detection element by a predetermined angle; and
  a sensor magnet to be located at the output shaft, said sensor magnet having a first magnetic pole and a second magnetic pole arranged in a peripheral direction and having different polarities, said first magnetism detection element and said second magnetism detection element being located opposite said second magnetic pole when said wiper arm is at a side of said upper reversal position relative to said reference position, at least one of said first magnetism detection element and said second magnetism detection element being located opposite said first magnetic pole when said wiper arm is at a side of said lower reversal position relative to said reference position, each of said first magnetism detection element and said second magnetism detection element being operable to detect a polarity of said sensor magnet and generate a signal based on the detected polarity;

wherein said wiper arm is operable to be moved toward said reference position based on a combination of the signals generated by said first magnetism detection element and said second magnetism detection element.

12. The wiper device of claim 11, wherein said first magnetism detection element is located opposite a boundary between said first magnetic pole and said second magnetic pole when said wiper arm is located at said reference position.

13. The wiper device of claim 11, wherein said first magnetism detection element and said second magnetism detection element are located opposite said first magnetic pole when said wiper arm is located at said lower reversal position.

14. The wiper device of claim 11, wherein a wiper arm stored position is located below said lower reversal position, said first magnetism detection element being located opposite said first magnetic pole and said second magnetism detection element being located opposite said second magnetic pole when said wiper arm is located at said stored position.

15. The wiper device of claim 14, wherein, when said wiper arm stops at a position other than said stored position, said wiper device is operable to always start said wiper arm to move toward said reference position at a restarting time.

16. The wiper device of claim 11, wherein, when said wiper arm stops between said upper reversal position and said lower reversal position during operation, said wiper device is operable to always start said wiper arm to move toward said reference position at a restarting time.

17. The wiper device of claim 11, further comprising a sensor for detecting a rotary angle of the rotary shaft, said sensor being operable to start detecting the rotary angle of the rotary shaft at a time when said wiper arm is at said reference position.

18. An electric motor comprising:
  a motor main body including a rotary shaft;
  a speed reduction mechanism for reducing a number of revolutions of said rotary shaft and transmitting the revolutions to an output shaft;
  a first magnetism detection element located opposite a predetermined position of said output shaft when a wiper arm to be connected to said output shaft is at a reference position;
  a second magnetism detection element arranged at a position spaced from said first magnetism detection element by a predetermined angle; and
  a sensor magnet at said output shaft and having a first magnetic pole and a second magnetic pole arranged in a peripheral direction and having different polarities, said first magnetism detection element and said second magnetism detection element being located opposite said second magnetic pole when the wiper arm is at a side relative to the reference position, at least one of said first magnetism detection element and said second magnetism detection element being located opposite said first magnetic pole when the wiper arm is at the other side relative to the reference position, each of said first magnetism detection element and said second magnetism detection element being operable to detect a polarity of said sensor magnet and generate a signal based on the detected polarity;
  wherein said electric motor is operable to move the wiper arm toward said reference position based on a combination of the signals generated by said first magnetism detection element and said second magnetism detection element.

* * * * *